US 9,246,653 B2

(12) United States Patent
Son et al.

(10) Patent No.: US 9,246,653 B2
(45) Date of Patent: Jan. 26, 2016

(54) METHOD FOR TRANSCEIVING DATA IN A WIRELESS ACCESS SYSTEM, AND BASE STATION AND TERMINAL FOR SAME

(75) Inventors: Hyukmin Son, Gyeonggi-do (KR);
Jinmin Kim, Gyeonggi-do (KR);
Seunghee Han, Gyeonggi-do (KR);
Hyunwoo Lee, Gyeonggi-do (KR);
Hyeyoung Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 14/131,834

(22) PCT Filed: Jul. 27, 2012

(86) PCT No.: PCT/KR2012/006021
§ 371 (c)(1),
(2), (4) Date: Jan. 9, 2014

(87) PCT Pub. No.: WO2013/015652
PCT Pub. Date: Jan. 31, 2013

(65) Prior Publication Data
US 2014/0153452 A1   Jun. 5, 2014

Related U.S. Application Data

(60) Provisional application No. 61/512,907, filed on Jul. 28, 2011, provisional application No. 61/522,220, filed on Aug. 10, 2011.

(51) Int. Cl.
*H04W 4/00* (2009.01)
*H04L 5/00* (2006.01)
*H04J 11/00* (2006.01)

(52) U.S. Cl.
CPC ............. *H04L 5/0053* (2013.01); *H04J 11/003* (2013.01); *H04L 5/001* (2013.01); *H04L 5/0037* (2013.01)

(58) Field of Classification Search
USPC .......................... 370/280, 329, 330, 331, 338
See application file for complete search history.

(56) References Cited

U.S. PATENT DOCUMENTS

2011/0064037 A1*  3/2011  Wei et al. ...................... 370/329
2011/0085503 A1*  4/2011  Nam et al. .................... 370/329
2011/0134774 A1*  6/2011  Pelletier et al. ............... 370/252

FOREIGN PATENT DOCUMENTS

| CN | 101789823 A | 7/2010 |
| CN | 101867953 A | 10/2010 |
| EP | 2696523 A2 | 2/2014 |
| EP | 2775641 A1 | 9/2014 |
| KR | 10-2009-0086040 A | 8/2009 |
| KR | 10-2010-0019957 A | 2/2010 |

(Continued)

*Primary Examiner* — Zewdu A Beyen
(74) *Attorney, Agent, or Firm* — Dentons US LLP

(57) ABSTRACT

Disclosed are a method for transceiving data in a wireless access system, and a base station and terminal therefor. More particularly, the present invention relates to a method for transceiving data, and to a base station device for the method, wherein the method comprises the steps of: transmitting, in a single first subframe, a physical downlink control channel (PDCCH) including downlink scheduling information on each terminal; and transmitting, in a plurality of second subframes, a physical downlink shared channel (PDSCH) relevant to said PDCCH to each terminal. The PDCCH supports a carrier aggregation that includes a field indicating said plurality of second subframes in which said PDSCH is transmitted.

8 Claims, 21 Drawing Sheets

(56) References Cited

FOREIGN PATENT DOCUMENTS

| | | |
|---|---|---|
| KR | 10-2010-0119508 A | 11/2010 |
| KR | 10-2011-0030607 A | 3/2011 |
| WO | 2011039862 A1 | 4/2011 |

\* cited by examiner

METHOD FOR TRANSCEIVING DATA IN A WIRELESS ACCESS SYSTEM, AND BASE STATION AND TERMINAL FOR SAME

This Application is a 35 U.S.C. §371 National Stage Entry of International Application No. PCT/KR2012/006021, filed Jul. 27, 2012 and claims the benefit of U.S. Provisional Application Nos. 61/512,907, filed Jul. 28, 2011 and 61/522,220, filed Aug. 10, 2011, all of which are incorporated by reference in their entirety herein.

TECHNICAL FIELD

The present invention relates to a wireless access system and, more particularly, to a method for transmitting and receiving data in a wireless access system supporting carrier aggregation/multiple cells and an apparatus for supporting the same.

BACKGROUND ART

One of the most important requirements of a next generation wireless access system is to be able to support high data transmission rate. To this end, a variety of technologies including multiple input multiple output (MIMO), cooperative multiple point transmission (CoMP), and relays have been studied.

A legacy wireless access system mainly considered only one carrier even though uplink bandwidth and downlink bandwidth are differently configured. For example, a wireless communication system in which the number of carriers constituting uplink and the number of carriers constituting downlink are one, respectively, and bandwidth of uplink is generally symmetrical to bandwidth of downlink, based on a single carrier, has been provided.

Nonetheless, in consideration of saturated frequency resources, CA/multiple cells for designing each of dispersed bandwidths to satisfy basic requirements capable of operating an independent system and for aggregating a plurality of bandwidths to one system has been introduced as a method for securing broad bandwidth in order to meet requirements for higher data transmission rate.

In this case, a carrier of a bandwidth unit available for an independent operation may be referred to as a component carrier (CC). To support increased transmission capacity, the bandwidth of a CC is extended to 20 MHz or more in a recent 3GPP long-term evolution-advanced (LTE-A) or 802.16m system. At this time, a broad bandwidth is supported by aggregating one or more CCs. For instance, if one CC supports a bandwidth of 5 MHz, 10 MHz, or 20 MHz, system bandwidth up to 100 MHz may be supported by aggregating a maximum of 5 CCs.

DETAILED DESCRIPTION OF THE INVENTION

Technical Problem

An object of the present invention is to provide a method for smoothly transmitting and receiving uplink/downlink data between a UE and an eNB in a wireless access system, preferably, in a wireless access system supporting CA and an apparatus therefor.

Another object of the present invention is to provide a method for transmitting and receiving data by performing cross subframe scheduling so as to reduce the influence of interference which may occur between homogeneous networks or between heterogeneous networks and an apparatus therefor.

It will be appreciated by persons skilled in the art that the objects that could be achieved with the present invention are not limited to what has been particularly described hereinabove and the above and other objects that the present invention achieves will be more clearly understood from the following detailed description.

Technical Solution

In an aspect of the present invention, provided herein is a method for transmitting and receiving data in a wireless access system, including transmitting, in one first subframe, a physical downlink control channel (PDCCH) including downlink scheduling information of each user equipment; and transmitting, in a plurality of second subframes, a physical downlink shared channel (PDSCH) corresponding to the PDCCH to each user equipment, wherein the PDCCH includes a field indicating the plural second subframes in which the PDSCH is transmitted.

In another aspect of the present invention, provided herein is a base station for transmitting and receiving data in a wireless access system, including a radio frequency (RF) unit for transmitting and a receiving a radio signal; and a processor for controlling the RF unit to transmit, in one first subframe, a physical downlink control channel (PDCCH) including downlink scheduling information of each user equipment and to transmit, in a plurality of second subframes, a physical downlink shared channel (PDSCH) corresponding to the PDCCH to each user equipment, wherein the PDCCH includes a field indicating the plural second subframes in which the PDSCH is transmitted.

If the wireless access system uses a time division duplex (TDD) scheme, the field may include an offset value for each subframe or for all subframes for transmission of the PDSCH and the offset value may indicate an interval between the first subframe and each of the second subframes.

If a modulation and coding scheme (MCS) level of each user equipment is less than a specific threshold value, PDSCHs may be transmitted in the second subframes.

A PDCCH region of each user equipment may be orthogonally located based on a cell identifier (ID).

The method may further include transmitting information about a carrier on which the PDSCH is transmitted through higher layer signaling.

The field may be a carrier indicator field (CIF) or a subframe indicator field (SIF).

Advantageous Effects

According to the embodiments of the present invention, uplink/downlink data can be smoothly transmitted and received between a UE and an eNB in a wireless access system, preferably, in a wireless access system supporting CA.

According to the embodiments of the present invention, the influence of interference can be reduced by performing cross subframe scheduling in which control information of a subframe greatly influenced by interference between homogeneous networks or between heterogeneous networks is transmitted in a subframe less influenced by interference.

According to the embodiments of the present invention, a UE can improve cell throughput and reduce the burden of implementation, due to mitigation of interference.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included as a part of the detailed description to provide a further understanding of the invention, provide embodiments of the invention and together with the description serve to explain the technical features of the invention.

BEST MODE FOR CARRYING OUT THE INVENTION

Figure 1:
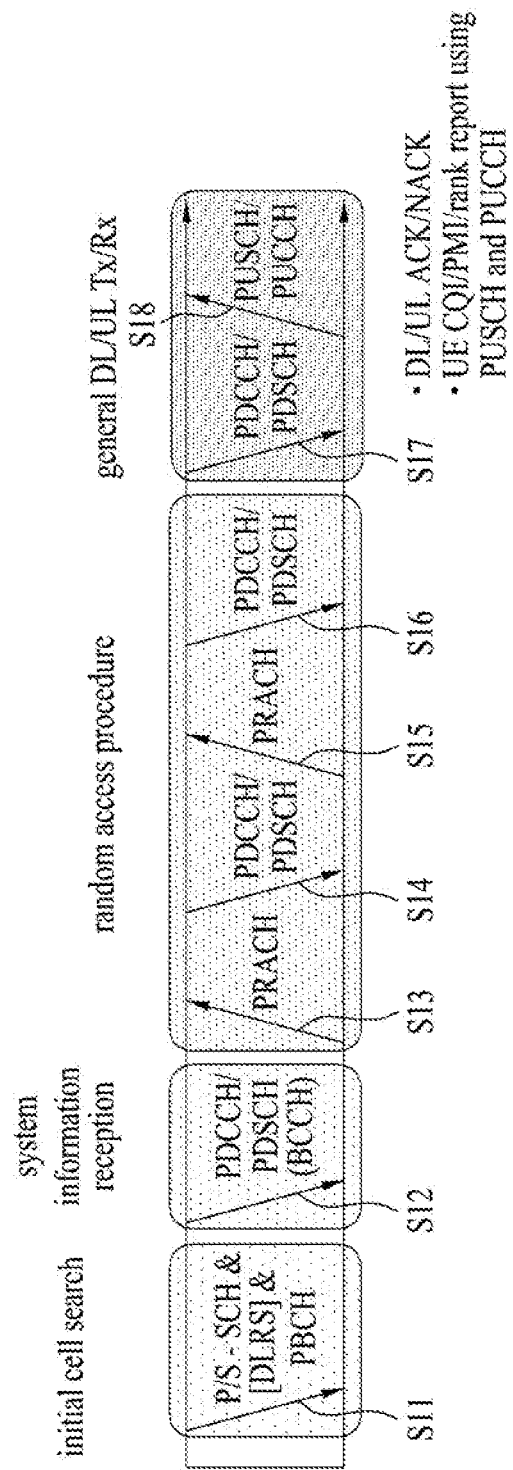
FIG. 1 is a diagram illustrating physical channels used in a 3GPP LTE system and a general signal transmission method using the same.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention.

In the embodiments of the present invention in this disclosure, a description is given of data transmission and reception between a base station (BS) and a terminal. Here, the BS refers to a terminal node of a network communicating directly with the terminal. In some cases, a specific operation described as being performed by the BS in this disclosure may be performed by an upper node of the BS. Namely, in a network comprised of a plurality of network nodes including the BS, various operations performed for communication with the terminal may be performed by the BS or network nodes other than the BS. The term 'BS' may be replaced with the terms fixed station, Node B, eNode B (eNB), access point, etc. The term 'relay' may be replaced with the terms relay node (RN), relay station (RS), etc. In addition, the term 'terminal' may be replaced with the terms user equipment (UE), mobile station (MS), mobile subscriber station (MSS), subscriber station (SS), etc.

Specific terms used in the following description are provided to aid in understanding of the present invention and those terms may be changed without departing from the technical spirit of the present invention.

The embodiments of the present invention may be supported by standard documents disclosed in at least one of wireless access systems including an institute of electrical and electronics engineers (IEEE) 802 system, a 3rd general partnership project (3GPP) system, 3GPP long term evolution (LTE) and LTE-advanced (LTE-A) systems, and a 3GPP2 system. That is, obvious steps or portions which are not described in the embodiments of the present invention may be supported by the above documents. In addition, all terms described in this disclosure may be explained by the above standard documents.

The following technology may be applied to a variety of wireless access systems using code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied as radio technology such as universal terrestrial radio access (UTRA) or CDMA2000. TDMA may be embodied as radio technology such as global system for mobile communications (GSM)/general packet radio service (GPRS)/enhanced data rates for GSM evolution (EDGE). OFDMA may be embodied with radio technology such as IEEE 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long-term evolution (LTE) is part of evolved UMTS (E-UMTS), which uses E-UTRA. 3GPP LTE employs OFDMA in downlink and employs SC-FDMA in uplink. LTE-A is an evolved version of 3GPP LTE.

For clarity, the following description focuses on 3GPP LTE/LTE-A. However, technical features of the present invention are not limited thereto.

1. Overview of 3GPP LTE/LET-A System to which the Present Invention is Applicable 1.1. System Overview FIG. 1 is a diagram illustrating physical channels used in a 3GPP LTE system and a general signal transmission method using the same.

A UE performs initial cell search such as synchronization establishment with an eNB when the UE is powered on or enters a new cell in step S11. To this end, the UE may receive a primary synchronization channel (P-SCH) and a secondary synchronization channel (S-SCH) from the eNB, establish synchronization with the eNB, and acquire information such as a cell identity (ID).

Thereafter, the UE may receive a physical broadcast channel (PBCH) from the eNB to acquire information broadcast in the cell. Meanwhile, the UE may receive a DL reference signal (RS) in the initial cell search step to confirm a downlink channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the eNB. To this end, the UE may transmit a preamble through a physical random access channel (PRACH) (S13) and receive a response message to the preamble through the PDCCH and the PDSCH corresponding to the PDCCH (S14). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH and/or PDSCH signal (step S17) and transmit a physical uplink shared channel (PUSCH) and/or physical uplink control channel (PUCCH) signal (step S18) according to a general UL/DL signal transmission procedure.

Control information the UE transmits to the eNB is referred to as uplink control information (UCI). The UCI includes a hybrid automatic repeat and request (HARQ) acknowledgement (ACK)/negative ACK (HACK), a scheduling request (SR), a channel quality indicator (CQI), a precoding matrix index (PMI), a rank indicator (RI), etc.

In the LTE system, UCI is generally periodically transmitted on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
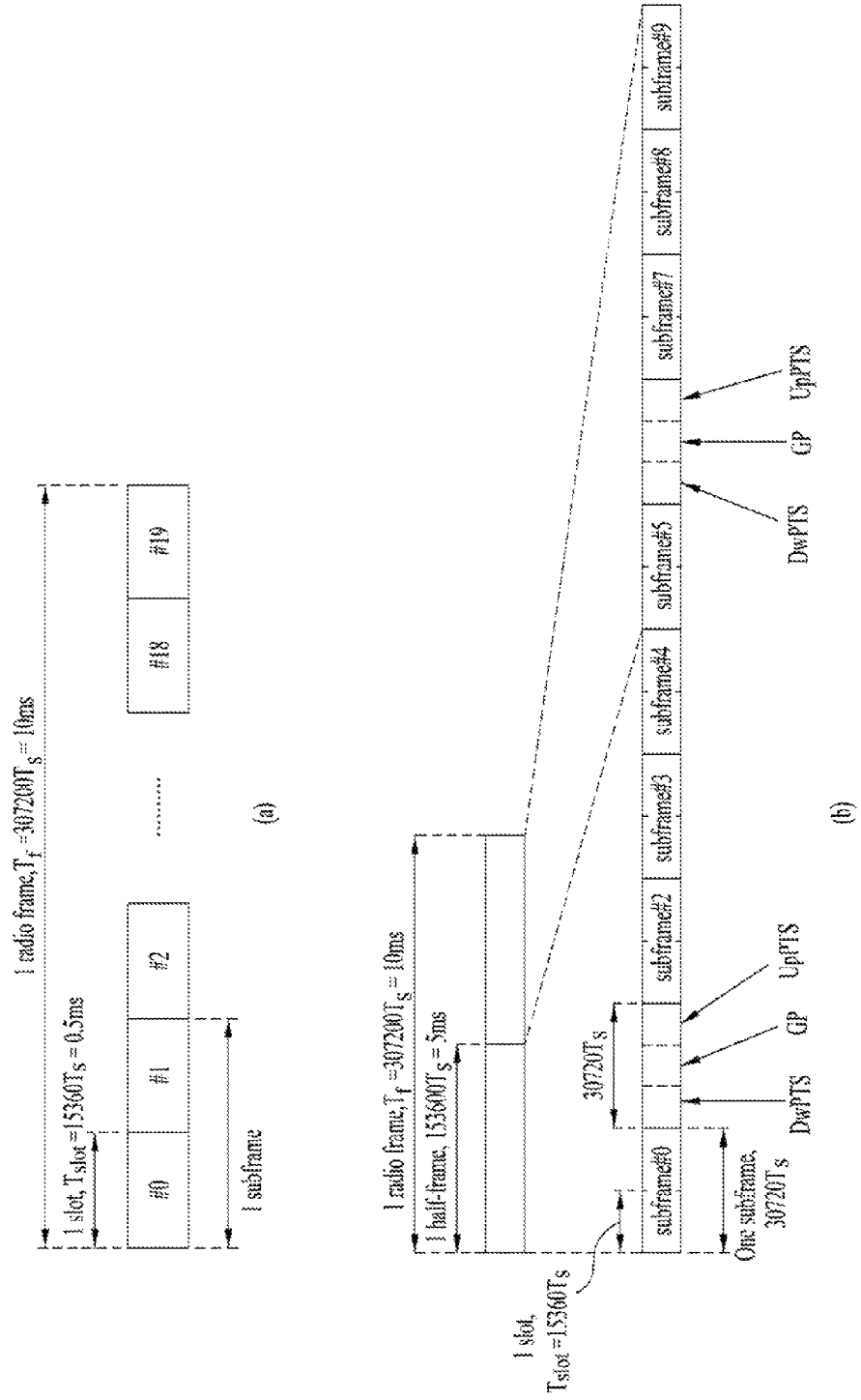
FIG. 2 illustrates the structure of a radio frame in a 3GPP LTE system.

FIG. 2 illustrates radio frame structures used in 3GPP LTE system.

FIG. 2($a$) illustrates frame structure type 1. Frame structure type 1 is applicable to both a full-duplex frequency division duplex (FDD) system and a half-duplex FDD system.

One radio frame is 10 ms ($T_f=307200 \cdot T_s$) long, including 20 slots of equal size indexed from 0 to 19. Each slot is 0.5 ms ($T_{slot}=15360 \cdot T_s$) long. One subframe includes two successive slots. An i-th subframe includes 2i-th and (2i+1)-th slots. That is, a radio frame includes 10 subframes. A time required to transmit one subframe is defined as a transmission time interval (TTI). $T_s$ is a sampling time given as $T_s=1/(15 \text{ kHz} \times 2048)=3.2552 \times 10^{-8}$ (about 33 ns). One slot includes a plurality of orthogonal frequency division multiplexing (OFDM) symbols or SC-FDMA symbols in the time domain and a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full-duplex FDD system, 10 subframes may be used simultaneously for DL transmission and UL transmission during a 10-ms duration. UL transmission and DL transmission are distinguished by frequency. On the other hand, a UE cannot perform transmission and reception simultaneously in a half-duplex FDD system.

The above radio frame structure is purely exemplary. Thus, the number of subframes in a radio frame, the number of slots in a subframe, and the number of OFDM symbols in a slot may be changed.

FIG. 2($b$) illustrates frame structure type 2. Frame structure type 2 is applied to a time division duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($\sim 30720 \cdot T_s$) long. An i-th subframe includes 2i-th and (2i+1)-th slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, a downlink pilot time slot (DwPTS), a guard period (GP), and an uplink pilot time slot (UpPTS). The DwPTS is used for initial cell search, synchronization, or channel estimation at a UE, and the UpPTS is used for channel estimation and UL transmission synchronization with a UE at an eNB. The GP is used to eliminate UL interference between a UL and a DL, caused by multi-path delay of a DL signal.

Table 1 below lists special subframe configurations (DwPTS/GP/UpPTS lengths).

TABLE 1

| | | Normal cyclic prefix in downlink | | Extended cyclic prefix in downlink | | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |

TABLE 1-continued

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

UL-DL configurations for frame structure type 2 represent rules of allocating (or reserving) each subframe as a DL subframe or a UL subframe. Table 2 lists such UL-DL configurations.

TABLE 2

| Uplink-downlink configuration | Downlink-to-Uplink Switch-point periodicity | Subframe number | | | | | | | | |
| --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, "D" represents a DL subframe, "U" represents a UL subframe, and "S" represents a special subframe including a DwPTS, a GP, and an UpPTS in a radio frame. 7 UL-DL configurations are available and differ in positions or numbers of DL subframes, special subframes, and UL subframes.

A time point at which DL switches to UL or UL switches to DL is called a switch point. Switch-point periodicity is a period in which switching between a UL subframe and a DL subframe is repeated in the same manner. The switch-point periodicity is 5 ms or 10 ms. If the switch-point periodicity is 5 ms, a special subframe S exists in every half-frame and if the switch-point periodicity is 10 ms, a special subframe S exists only in the first half-frame.

In every UL-DL configuration, subframe 0, subframe 5, and the DwPTS are used for DL transmission, and the UpPTS and the subframe following a special subframe are always used for UL transmission.

The UL-DL configurations are system information that may be known to both an eNB and UEs. Each time UL-DL configuration information is changed, the eNB may inform a UE of the change in the UL-DL allocation state of a radio frame to a UE by transmitting only the index of configuration information. The configuration information is a kind of downlink control information (DCI) and may be transmitted on a DL control channel, PDCCH, like other scheduling information. The configuration information may be broadcast to all UEs within a cell on a broadcast channel (BCH). The number of half-frames in a radio frame, the number of subframes in a half-frame, and DL-UL subframe combinations in the TDD system are purely exemplary.

Meanwhile, an HARQ ACK/NACK transmitted to the UE on a PHICH in an i-th subframe in an FDD system is associated with a PUSCH signal that the UE transmits in an (i-4)-th subframe.

On the other hand, since a DL/UL subframe configuration in a TDD system is different per UL-DL configuration, PUSCH and PHICH transmission timings vary according to the UL-DL configuration and to a subframe index (or number).

In an LTE system, the UL/DL timing relationship between a PUSCH, a PDCCH preceding the PUSCH, and a PHICH on which a DL HARQ ACK/NACK corresponding to the PUSCH is transmitted is predetermined.

Figure 3:
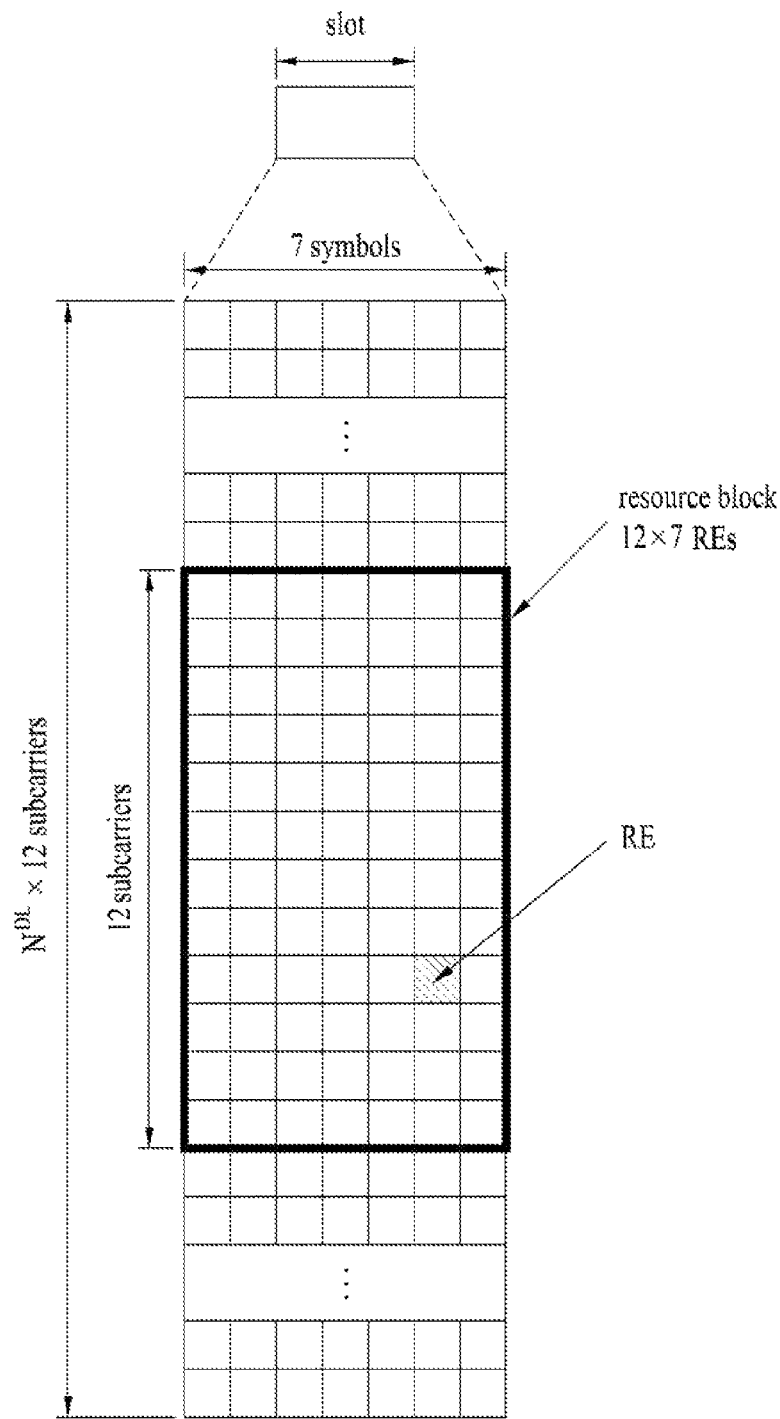
FIG. 3 illustrates a resource grid for a downlink slot.

FIG. 3 illustrates a resource grid for a DL slot.

Referring to FIG. 3, one DL slot includes a plurality of OFDM symbols in the time domain. One DL slot includes 7 OFDM symbols and an RB includes 12 subcarriers in the frequency domain, to which the present invention is not limited.

Each element of the resource grid is referred to as a resource element (RE). One RB includes 12×7 REs. The number of RBs in a DL slot, NDL, depends on a DL transmission bandwidth. A UL slot may have the same structure as a DL slot.

Figure 4:
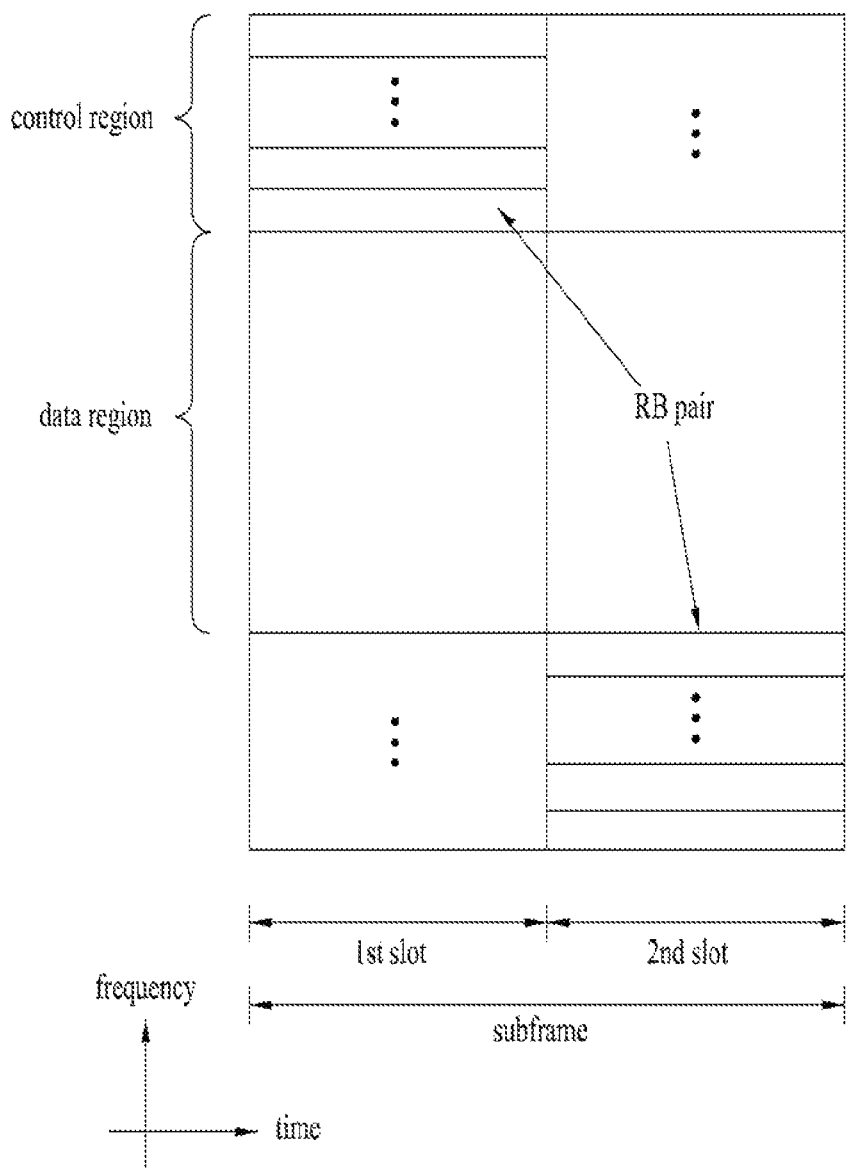
FIG. 4 illustrates the structure of an uplink subframe.

FIG. 4 illustrates the structure of a UL subframe.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair allocated to the PUCCH frequency-hops over a slot boundary.

Figure 5:
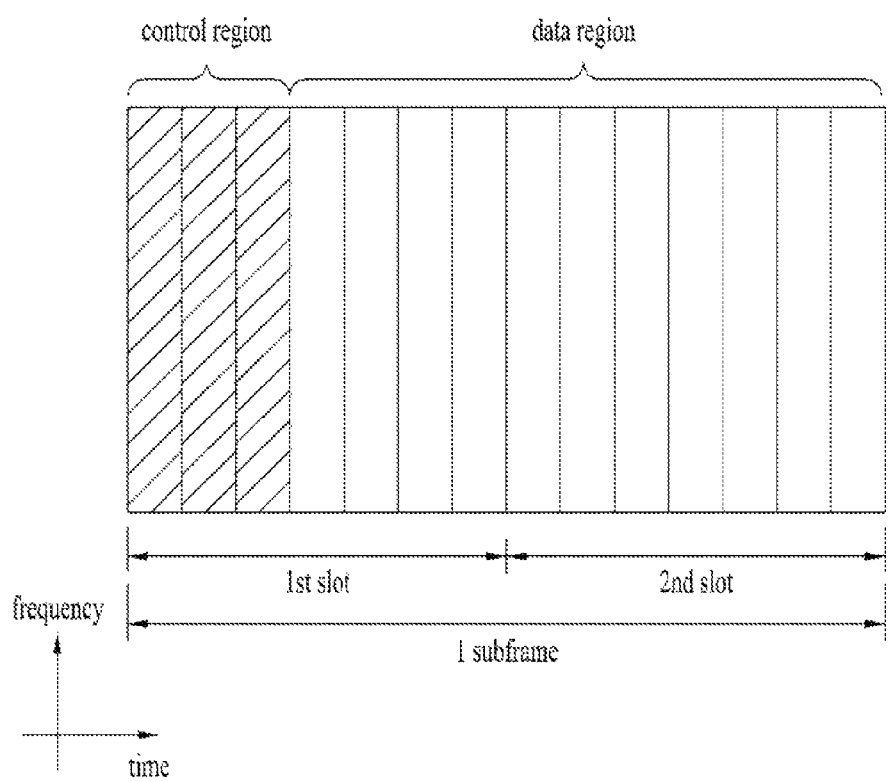
FIG. 5 illustrates the structure of a downlink subframe.

FIG. 5 illustrates the structure of a DL subframe.

Referring to FIG. 5, up to three OFDM symbols in the first slot in a DL subframe are used as a control region to which control channels are allocated and the other OFDM symbols of the DL subframe are used as a data region to which a PDSCH is allocated. DL control channels defined for the 3GPP LTE system include a physical control format indicator channel (PCFICH), a PDCCH, and a physical hybrid ARQ indicator channel (PHICH).

The PCFICH is transmitted in the first OFDM symbol of a subframe and carries information about the number of OFDM symbols used for transmission of control channels (i.e. the size of the control region) in the subframe. The PHICH is a response channel to a UL transmission and carries an HARQ ACK/NACK signal. Control information transmitted on the PDCCH is called downlink control information (DCI). The DCI includes UL resource assignment information (UL grant), DL resource assignment information, or UL transmission (Tx) power control commands for a UE group.

1.2. Physical Downlink Control Channel (PDCCH)

1.2.1. PDCCH Overview

A PDCCH may deliver information about resource allocation and a transmission format for a downlink shared channel (DL-SCH) (i.e. a DL grant), information about resource allocation for an uplink shared channel (UL-SCH) (i.e. a UL grant), paging information of a paging channel (PCH), system information on the DL-SCH, information about resource allocation for a higher-layer control message such as a random access response transmitted on the PDSCH, a set of Tx power control commands for individual UEs of a UE group, voice over Internet protocol (VoIP) activation indication information, etc. A plurality of PDCCHs may be transmitted in the control region. A UE may monitor a plurality of PDCCHs. A PDCCH is composed of an aggregate of one or more consecutive control channel elements (CCEs). A PDCCH composed of one or more consecutive CCEs may be transmitted in the control region after subblock interleaving. A CCE is a logical allocation unit used to provide a PDCCH at a code rate based on the state of a radio channel. A CCE corresponds to a plurality of resource element groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be transmitted in the control region. A PDCCH is composed of an aggregate of one or more consecutive CCEs. A CCE is a unit of 9 REGs each including 4 REs. Four quadrature phase shift keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{RFG}$. Then the number of CCEs available in the system is $N_{CCE}(=\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, if a CCE index is i, the PDCCH format may start with a CCE satisfying i mod n=0

The eNB may configure one PDCCH signal with 1, 2, 4, or 8 CCEs. {1, 2, 4, 8} are called CCE aggregation levels. The number of CCEs used for transmission of a specific PDCCH is determined by the eNB according to channel state. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness. Furthermore, the power level of the PDCCH may be adjusted to correspond to the channel state.

Table 3 illustrates PDCCH formats. 4 PDCCH formats are supported according to CCE aggregation levels as illustrated in Table 3.

TABLE 3

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or modulation and coding scheme (MCS) level of control information delivered in a PDCCH is different. An MCS level defines a code rate used for data coding and a modulation order. An adaptive MCS level is used for link adaptation. Generally, three or four MCS levels may be considered for control channels carrying control information.

Regarding the formats of control information, control information transmitted on a PDCCH is called DCI. The configuration of information carried in PDCCH payload may be changed depending on DCI format. The PDCCH payload is information bits. Table 4 lists DCI according to DCI formats.

TABLE 4

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 4, the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of transmission power control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data on the PDSCH is related to a DCI format signaled through a PDCCH. The transmission mode may be configured semi-statically for the UE by higher-layer signaling (e.g. radio resource control (RRC) signaling). The transmission mode may be classified as single antenna transmission or multi-antenna transmission. A transmission mode is semi-statically configured for a UE by higher-layer signaling. For example, multi-antenna transmission includes transmit diversity, open-loop or closed-loop spatial multiplexing, multi-user multiple input multiple output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique for increasing the signal to interference plus noise ratio (SINR) of a signal by weighting to multiple antennas according to channel states.

A DCI format depends on the transmission mode configured for the UE. The UE has a reference DCI format monitored according to the transmission mode configured for the UE. The following 7 transmission modes are available to UEs:

(1) Single antenna port: port 0
(2) Transmit diversity
(3) Open-loop spatial multiplexing
(4) Closed-loop spatial multiplexing
(5) MU-MIMO
(6) Closed-loop rank-1 precoding
(7) Single antenna port: port 5.

1.2.3 PDCCH Transmission

The eNB determines a PDCCH format according to DCI that will be transmitted to the UE and adds a cyclic redundancy check (CRC) to the control information. The CRC is masked by a unique identifier (ID) (e.g. a radio network temporary identifier (RNTI)) according to the owner or usage of the PDCCH. If the PDCCH is destined for a specific UE, the CRC may be masked by a unique ID, e.g. a cell-RNTI (C-RNTI) of the UE. If the PDCCH carries a paging message, the CRC of the PDCCH may be masked by a paging indicator ID, e.g. a Paging-RNTI (P-RNTI). If the PDCCH carries system information, particularly, a system information block (SIB), the CRC of the PDCCH may be masked by a system information ID, e.g. a system information RNTI (SI-RNTI). To indicate that the PDCCH carries a random access response to a random access preamble transmitted by a UE, the CRC of the PDCCH may be masked by a random access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. In this case, a modulation order corresponding to the MCS level may be used for modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD) A plurality of PDCCHs may be transmitted in one subframe. That is, the control region of one subframe includes a plurality of CCEs, CCE 0 to CCE $N_{CCE,k}-1$. $N_{CCE,k}$ is the total number of CCEs in the control region of a k-th subframe. A UE monitors a plurality of PDCCHs in every subframe. Monitoring means that the UE attempts to decode each PDCCH according to a monitored PDCCH format. The eNB does not provide the UE with information about the position of a PDCCH directed to the UE in an allocated control region of a subframe. Since the UE has no knowledge of the position, CCE aggregation level, or DCI format of a PDCCH thereof, the UE searches for the PDCCH by monitoring a set of PDCCH candidates in the subframe in order to receive a control channel transmitted from the eNB. This is called blind decoding/detection. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a discontinuous reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive a PDCCH transmitted to the UE, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for the PDCCH, the UE should attempt detection with all possible CCE aggregation levels until the UE succeeds in blind decoding of the PDCCH.

In the LTE system, the concept of a search space (SS) is defined for blind decoding of a UE. An SS is a set of PDCCH candidates that the UE will monitor and may have a different size according to each PDCCH format. There are two types of SSs, common search space (CSS) and UE-specific/dedicated search space (USS). While all UEs may know the size of a CSS, a USS may be configured for each individual UE. Accordingly, a UE should monitor both a CSS and a USS to decode a PDCCH. As a consequence, the UE performs up to 44 blind decoding (BD) procedures per one subframe, except for BD procedures based on different CRC values (e.g. C-RNTI, P-RNTI, SI-RNTI, and RA-RNTI).

With a small SS, the eNB may not secure CCE resources for transmitting PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

Table 5 illustrates the sizes of CSSs and USSs.

TABLE 5

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2, may be required for the UE.

The UE may search for DCI Format 1A and DCI Format 1C in a CSS. The UE may also be configured to search for DCI Format 3 or DCI Format 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following Equation 1.

$$L \cdot \{(Y_k + m) \bmod \lfloor N_{CCE,k}/L \rfloor\} + i \qquad \text{[Equation 1]}$$

Here $M^{(L)}$ is the number of PDCCH candidates with CCE aggregation level L to be monitored in the SS, m=0, . . . , $M^{(L)}-1$, i is the index of a CCE in each PDCCH candidate, and i=0, . . . , L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. Table 6 illustrates PDCCH candidates monitored by a UE.

TABLE 6

| Search space $S_k^{(L)}$ | | | Number of PDCCH |
|---|---|---|---|
| Type | Aggregation level L | Size [in CCEs] | candidates $M^{(L)}$ |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

Referring to Equation 1, for two aggregation levels, L=4 and L=8, $Y_k$ is set to 0 in the CSS, whereas $Y_k$ is defined by Equation 2 for aggregation level L in the USS.

$$Y_k = (A \cdot Y_{k-1}) \bmod D \quad \text{[Equation 2]}$$

Here $Y_{-1} = n_{RNTI} \neq 0$ and $n_{RNTI}$ indicates an RNTI value, A=39827, and D=65537.

2. Carrier Aggregation (CA) Environment 2.1 CA Overview

A communication environment considered in the embodiments of the present invention includes all multicarrier support environments. That is, a multicarrier system or carrier aggregation (CA) system used in the present invention is a system using CA by aggregating one or more component carriers (CCs) each having a narrower bandwidth than a target bandwidth during configuration of a target broad bandwidth, in order to support a broad bandwidth.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system. For example, the legacy 3GPP LTE system supports bandwidths of {1.4, 3, 5, 10, 15, and 20 MHz} and the 3GPP LTE-A system may support a broader bandwidth than 20 MHz using these LTE bandwidths for compatibility with the legacy system. A CA system of the present invention may support CA by defining a new bandwidth irrespective of the bandwidths used in the legacy system.

The LTE-A system adopts the concept of a cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources. If one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells is configured for the UE, a CA environment using more UL CCs than DL CCs may also be supported. That is, CA may be regarded as aggregation of two or more cells having different carrier frequencies (center frequencies). Herein, the term 'cell' should be distinguished from a generally used 'cell' as an area covered by an eNB.

Cells used in the LTE-A system include a primacy cell (PCell) and a secondary cell (SCell). A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId, is an integer value ranging from 0 to 503. A short ID of an SCell, SCellIndex, used to identify an SCell is an integer value ranging from 1 to 7. A short ID of a serving cell (PCell or SCell), ServeCellIndex, is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may occur only in the PCell. In addition, the UE may use only the PCell in acquiring system information or changing a monitoring procedure. An evolved universal terrestrial radio access network (E-UTRAN) may change only a PCell for a handover procedure by a higher-layer RRC connection reconfiguration (RRCConnectionReconfiguraiton) message including mobility control information (mobilityControlInfo) to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment. When the E-UTRAN adds an SCell to a UE supporting CA, the E-UTRAN may transmit all system information related to operations of related cells in RRC_CONNECTED state to the UE through dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. In the following embodiments, a primary CC (PCC) and a PCell may be used as the same meaning and a Secondary CC (SCC) and an SCell may be used as the same meaning.

Figure 6:
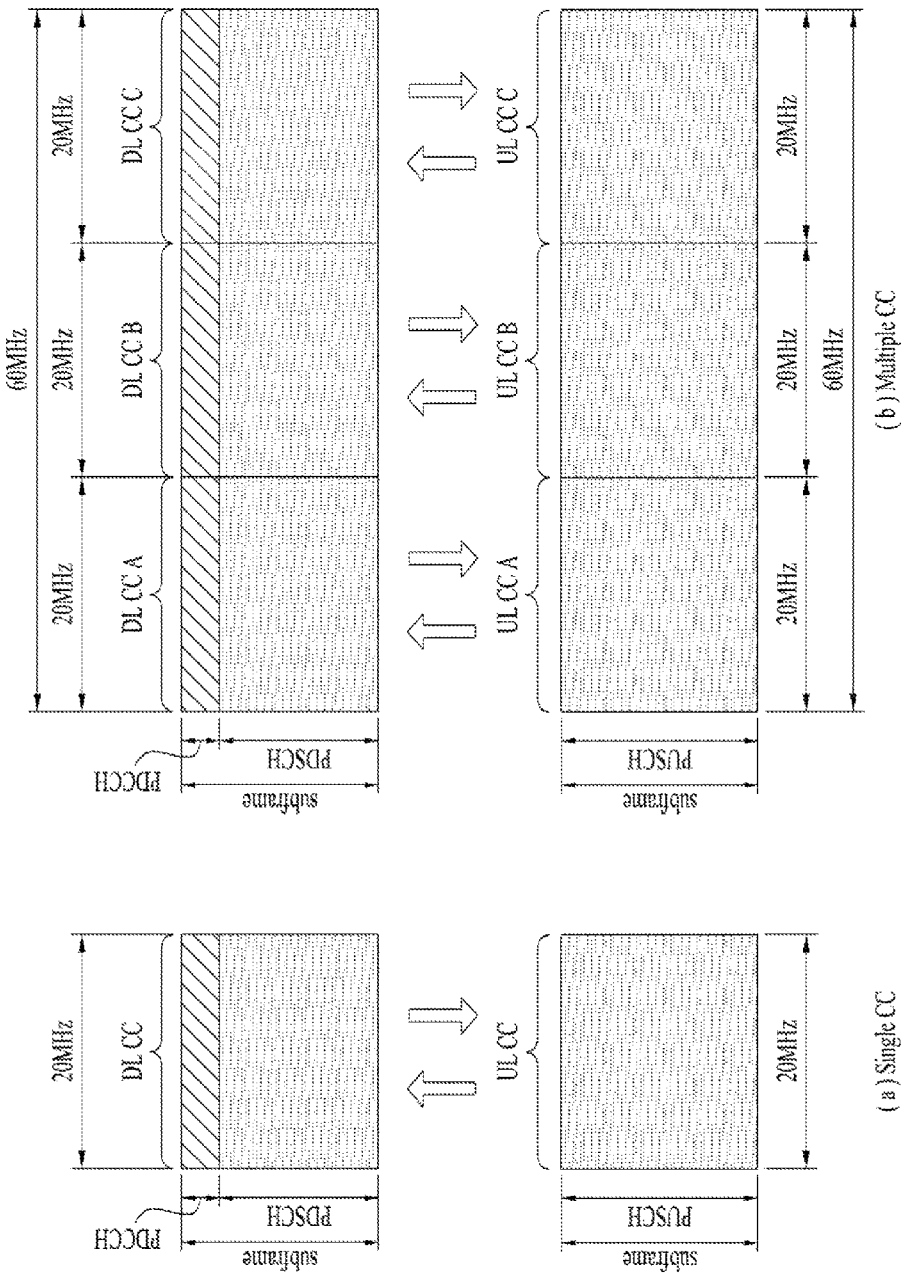
FIG. 6 illustrates an example of CCs of an LTE system and CA used in an LTE-A system.

FIG. 6 illustrates an example of CCs of an LTE system and CA used in an LTE-A system.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by system information block type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying a HARQ ACK/NACK signal.

2.2 Cross Carrier Scheduling

Two scheduling schemes, self-scheduling and cross carrier scheduling, are defined for a CA system, from the perspective of carriers or serving cells. Cross carrier scheduling may be called cross CC scheduling or cross cell scheduling.

In self-scheduling, a PDCCH (a DL grant) and a PDSCH are transmitted in the same DL CC or a PUSCH is transmitted on a UL CC linked to a DL CC on which a PDCCH (a UL grant) is received.

In cross carrier scheduling, a PDCCH (a DL grant) and a PDSCH are transmitted in different DL CCs or a PUSCH is transmitted on a UL CC other than a UL CC linked to a DL CC on which a PDCCH (a UL grant) is received.

Cross carrier scheduling may be activated or deactivated UE-specifically and indicated to each UE semi-statically by higher-layer signaling (e.g. RRC signaling).

If cross carrier scheduling is activated, a carrier indicator field (CIF) is required in a PDCCH to indicate a DL/UL CC on which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is configured. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted on a DL CC allocates PDSCH resources of the same DL CC or allocates PUSCH resources on a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an SS configuration and PDCCH monitoring are needed.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Alternatively, the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need to signal the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 7:
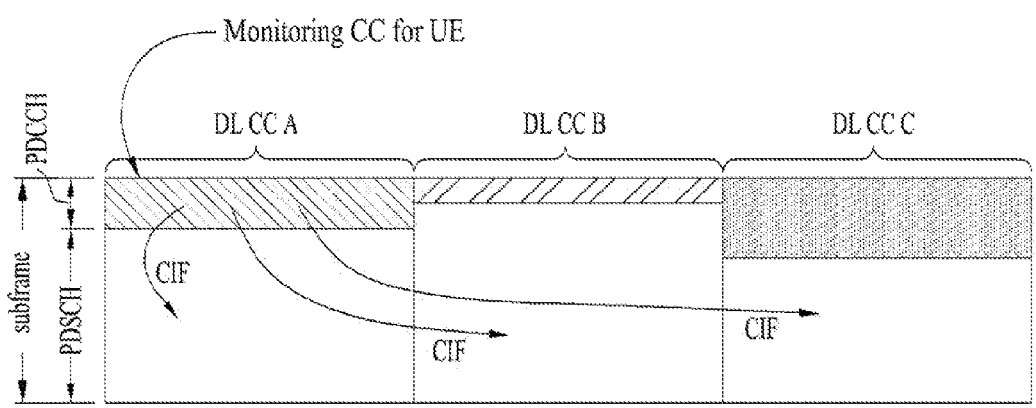
FIG. 7 illustrates the structure of a subframe of an LTE-A system according to cross carrier scheduling.

FIG. 7 illustrates the structure of a subframe of an LTE-A system according to cross carrier scheduling.

Referring to FIG. 7, three DL CCs are aggregated for a DL subframe for LTE-A UEs. DL CC 'A' is configured as a PDCCH monitoring DL CC. If a CIF is not used, each DL CC may transmit a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Interference Between eNBs

In a cellular network based wireless communication system, interference occurs between homogeneous networks or between heterogeneous networks. Such interference may have an effect on control channels as well as data channels. Hereinafter, a method of solving such a problem will be described.

3.1. Almost Blank Subframe (ABS) Allocation

A heterogeneous network deployment refers to a structure in which micro cells for low-power/near-field communication coexist in a macro cell based homogeneous network. A macro cell (or macro eNB) is a general cell (or eNB) of a wireless communication system having wide coverage and high transmit power. A micro cell (or micro eNB) is a micro version of the macro cell and may independently operate while performing most functions of the macro cell. The micro cell refers to an overlay type of cell installed in an area covered by the macro cell or a non-overlay type of cell installed in a shadow area not covered by the macro cell. The micro cell may accommodate fewer UEs than the macro cell with narrow coverage and low transmit power relative to the macro cell. The micro cell may also be referred to as a pico cell, a femto cell, a home evolved Node B (HeNB), a relay, etc.

A UE may be served directly by the macro cell or served by the micro cell. In some cases, a UE in the coverage area of the micro cell may be served by the macro cell.

The micro cell may be categorized as two types depending on whether the access of the UE is restricted. First type is a closed subscriber group (CSG) cell which does not permit access of existing macro UEs (UEs served by the macro cell) or other micro UEs (UEs served by the micro cell) without authentication. The second type is an open access subscriber group (OASC) or open subscriber group (OSC) cell which permits access of existing macro UEs or other micro UEs.

In a heterogeneous network environment in which macro cells and micro cells coexist, serious inter-cell interference may occur relative to a homogeneous network environment in which only macro cells (or only micro cells) exist.

Figure 8:
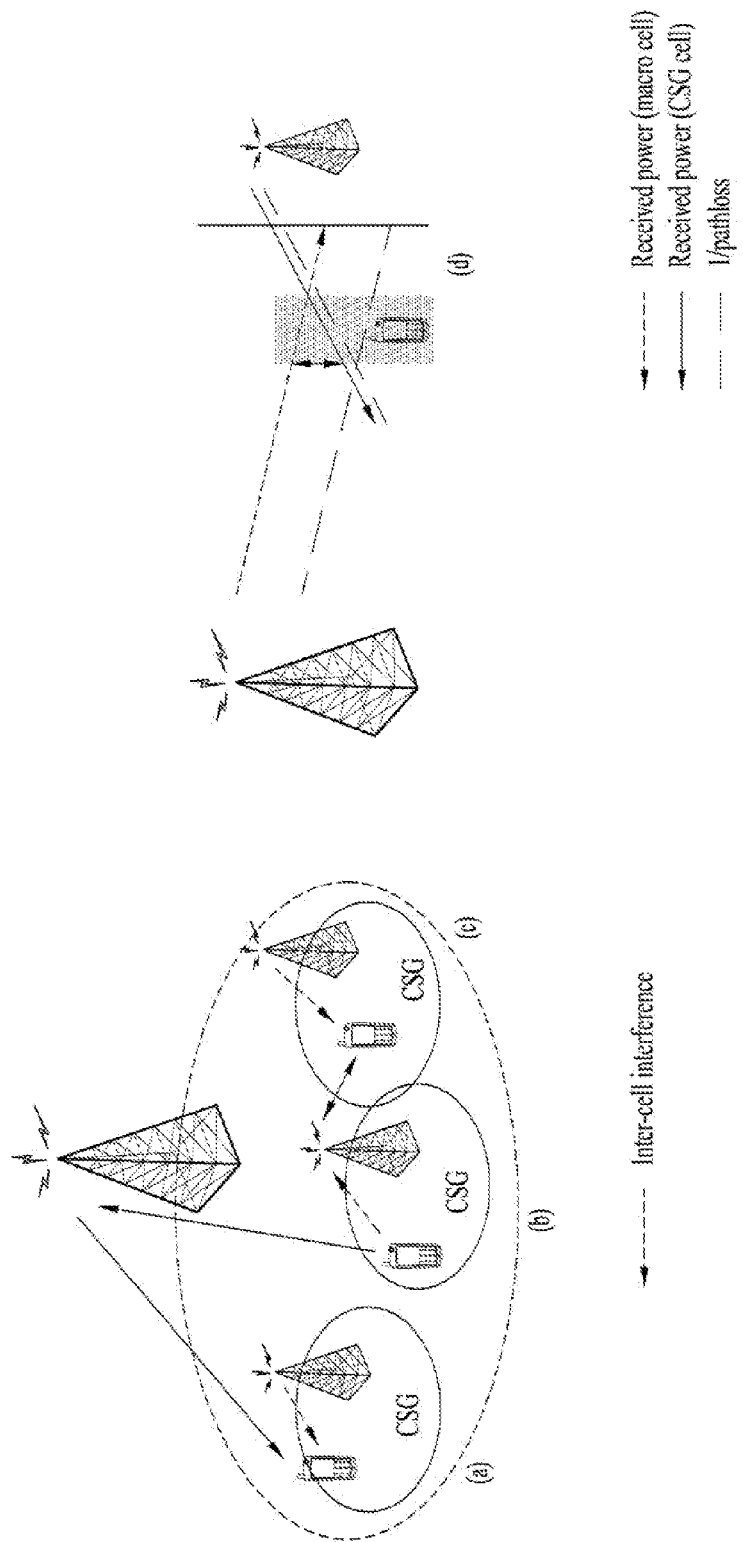
FIG. 8 is a diagram illustrating interference which may occur in a heterogeneous network wireless communication system including a macro cell and micro cells.

FIG. 8 is a diagram illustrating interference which may occur in a heterogeneous network wireless communication system including a macro cell and micro cells.

Referring to FIG. 8, in case (a), a macro UE with no access to a CSG cell is interfered by an HeNB. In case (b), a macro UE causes severe interference towards an HeNB. In case (c), a CSG UE is subject to interference by another CSG cell. In case (d), path-loss based cell association (e.g. by using biased reference signal received power (RSRP) reports) may improve uplink interference at the cost of increasing downlink interference of a non-macro UE at a cell edge.

This indicates that methods for handling uplink and downlink interference towards data as well as the first layer (L1)/the second layer (L2) control signaling, synchronization signals, and reference signals are important. Such methods may operate in time, frequency and/or spatial domains.

In a macro-pico heterogeneous network, a macro cell may cause strong interference to UEs served by a pico cell, especially UEs on the edge of the serving pico cell. With time domain inter-cell interference coordination (ICIC), an interfering macro cell provides a subframe, called an almost blank subframe (ABS or ABSF), protected from dominant interference due to the macro cell, by not transmitting any downlink control and data channels except for a cell-specific reference signal (CRS). If a primary synchronization signal (PSS), a secondary synchronization signal (SSS), a primary broadcast channel (PBCH), system information block 1 (SIB1), paging, and a positioning reference signal (PRS) coincide with an ABS, they are transmitted in the ABS. If an ABS coincides with a multicast broadcast single frequency network (MB-SFN) subframe not carrying any signal in a data region, a common reference signal (CRS) is not transmitted in the data region.

Figure 9:
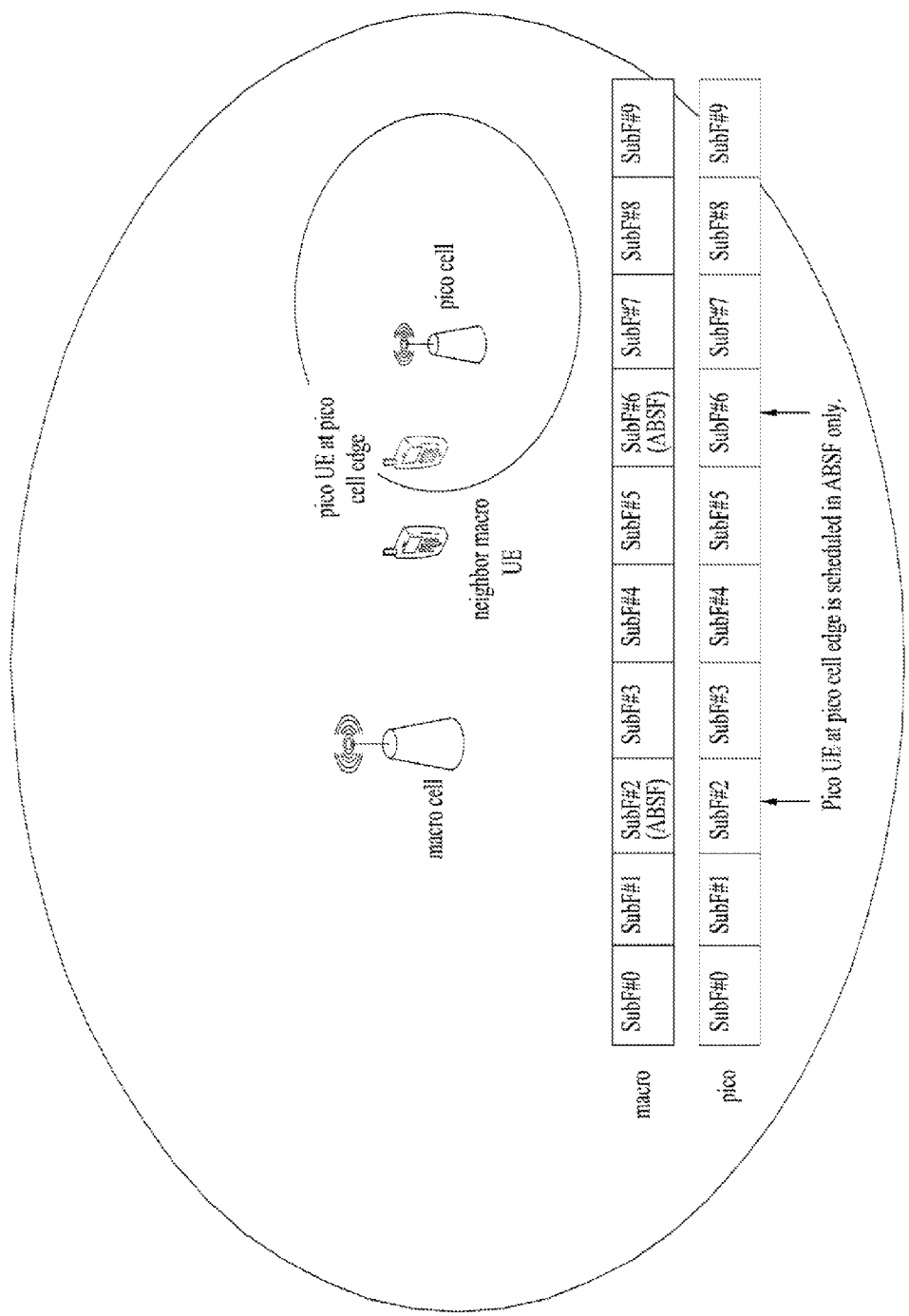
FIG. 9 is a diagram illustrating the configuration of an ABS in a macro cell in a macro-pico network.

FIG. 9 is a diagram illustrating the configuration of an ABS in a macro cell in a macro-pico network.

Referring to FIG. 9, the macro cell configures subframes #2 and #6 as ABSFs. This information may be indicated to a pico cell via backhaul. Based on the information received from the macro cell, the pico cell may schedule a pico UE (a UE served by the pico cell), especially, a UE on the boundary of the macro and pico cell, only in ABSFs. That is, channel state information (CSI) measurement is performed only in those ABSFs.

An interfered UE is configured by a serving cell thereof to perform measurements for radio link monitoring (RLM)/radio resource management (RRM) in restricted subframe(s), which prevents unnecessary radio link failure (RLF) and obtains accurate measurement results of RSRP/reference signal received quality (RSRQ). Bit map signaling (e.g. 1 may indicate an ABS and 0 may indicate a subframe other than the ABS) with the same periodicity as backhaul signaling may be applied but a pattern independent of the backhaul bit pattern should be configured.

Two scenarios of the CSG scenario and the pico scenario have been proposed in which conventional ICIC techniques are insufficient to overcome co-channel interference. The proposed scenarios are examples of network configurations that are intended to depict the basic concept of time domain ICIC and are apparently applicable to other network deployment scenarios.

Figure 10:
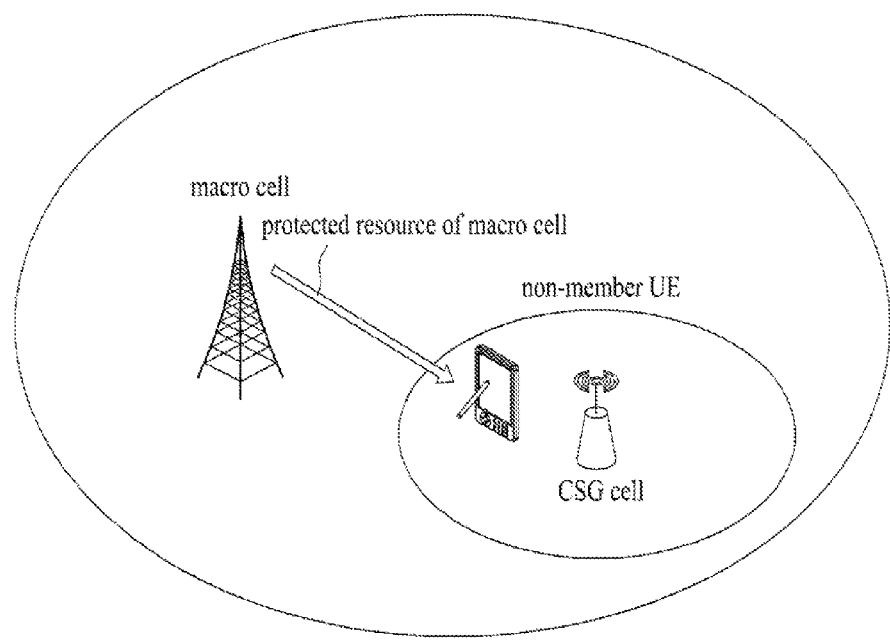
FIG. 10 illustrates a CSG scenario as exemplary time domain ICIC.

FIG. 10 illustrates a CSG scenario as exemplary time domain ICIC.

Referring to FIG. 10, dominant interference condition may happen when a UE, access of which to a CSG cell is not permitted, (hereinafter, referred to as a 'non-member UE'), is in close proximity to the CSG cell. Depending on network deployment and strategy, it may not be possible to divert UEs suffering from inter-cell interference to another E-UTRA or radio access technology (RAT) carrier. Time domain ICIC may be used to allow such non-member UEs to remain served by a macro cell on the same frequency layer.

Such interference may be mitigated by the CSG cell utilizing an ABSF to protect subframes of the corresponding macro cell from interference. The non-member UE may be signaled to utilize the protected resources for RRM, RLM, and CSI measurements for the serving macro cell, allowing the UE to continue to be served by the macro cell under strong interference from the CSG cell.

In an RRC_CONNECTED state, a network may find out that a non-member UE is subject to dominant interference from a CSG cell through measurement events defined in, for example, release-8/9 and may configure RRM/RLM/CSI measurement resource restriction for the non-member UE. The network may also configure RRM measurement resource restriction for neighbor cells in order to facilitate mobility from the serving macro cell. The network may release RRM/RLM/CSI measurement resource restriction upon detecting that the UE is no longer severely interfered by the CSG cell.

Figure 11:
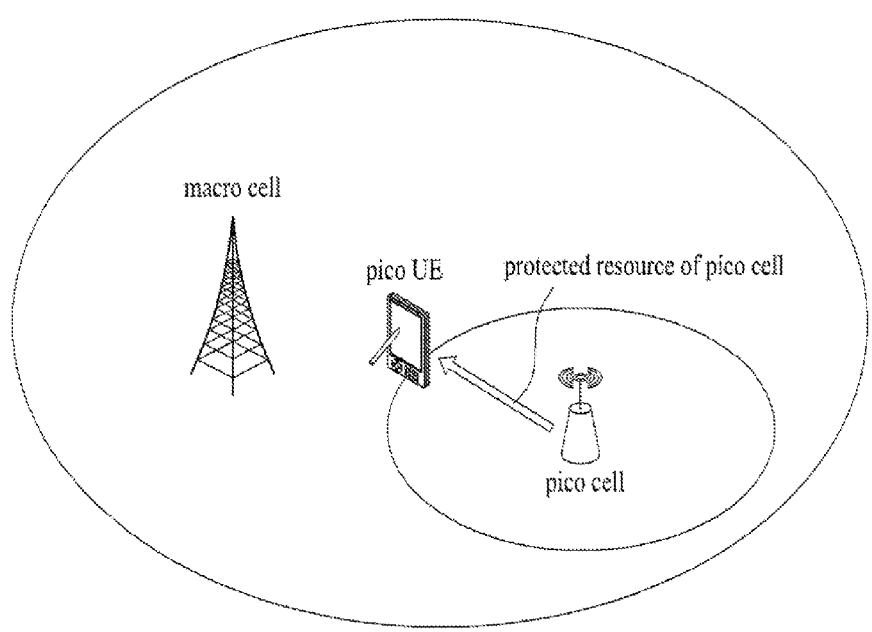
FIG. 11 illustrates a pico scenario as exemplary time domain ICIC.

FIG. 11 illustrates a pico scenario as exemplary time domain ICIC.

Referring to FIG. 11, time domain ICIC may be utilized for a pico UE (e.g. a UE for traffic off-loading from a macro cell to a pico cell) on the boundary of the serving pico cell. Time domain ICIC may be utilized to allow such a UE to remain served by the pico cell on the same frequency layer. Such interference may be mitigated by a macro cell utilizing an ABSF to protect subframes of the corresponding pico cell from interference. A pico UE (a UE served by the pico cell) uses protected resources for RRM, RLM, and CSI measurements for the serving pico cell. For the pico UE, RRM/RLM/CSI measurement resource restriction may allow more accurate measurement of the pico cell under strong interference from the macro cell. The pico cell may selectively configure RRM/RLM/CSI measurement resource restriction only for those UEs subject to strong interference from the macro cell. In addition, for a UE served by a macro cell, the network may configure RRM measurement resource restriction for neighbor cells in order to facilitate mobility from the macro cell to the pico cell.

A method for transmitting information about a subframe pattern (e.g. an ABS pattern) between cells will now be described.

An interfering cell may signal two bitmaps to an interfered cell through an X2 interface. Each bitmap may be comprised of 40 bits and attributes of each subframe may be expressed in the unit of 40 subframes. The first bitmap indicates ABS positioning subframes. That is, the first bitmap may indicate an ABS by 1 and a subframe other than the ABS by 0. The second bitmap may indicate subframes to be configured as ABSs with a high probability in the first bitmap. That is, subframes configured necessarily as the ABSs in the second bitmap may correspond to a subset of subframes configured as the ABSs in the first bitmap. The subset may be used at a receiving end to configure restricted RLM/RRM measurement. A serving cell indicates actual resources for RLM/RRM and CSI through RRC signaling.

A bitmap pattern is used to indicate an ABS pattern from a macro cell to a pico cell. In an FDD system, a bitmap pattern period is 40 ms. In a TDD system, the bitmap pattern period is 20 ms for uplink (UL)-downlink (DL) configurations 1 to 5, 70 ms for UL-DL configuration 0, and 60 ms for UL-DL configuration 6.

The bitmap pattern may be updated semi-statically. Update triggering may be aperiodic and may be generated on an event basis.

3.2. Scheduling Information Exchange Between eNBs

As described above, in order to mitigate interference between eNBs, an ABS is allocated to mitigate interference of a data channel (PDSCH) in an LTE/LTE-A system so that a victim cell may receive an interference-free signal.

In addition to the above method, frequency regions allocated to UEs located at a cell edge may be orthogonally configured using scheduling information between eNBs.

Figure 12:
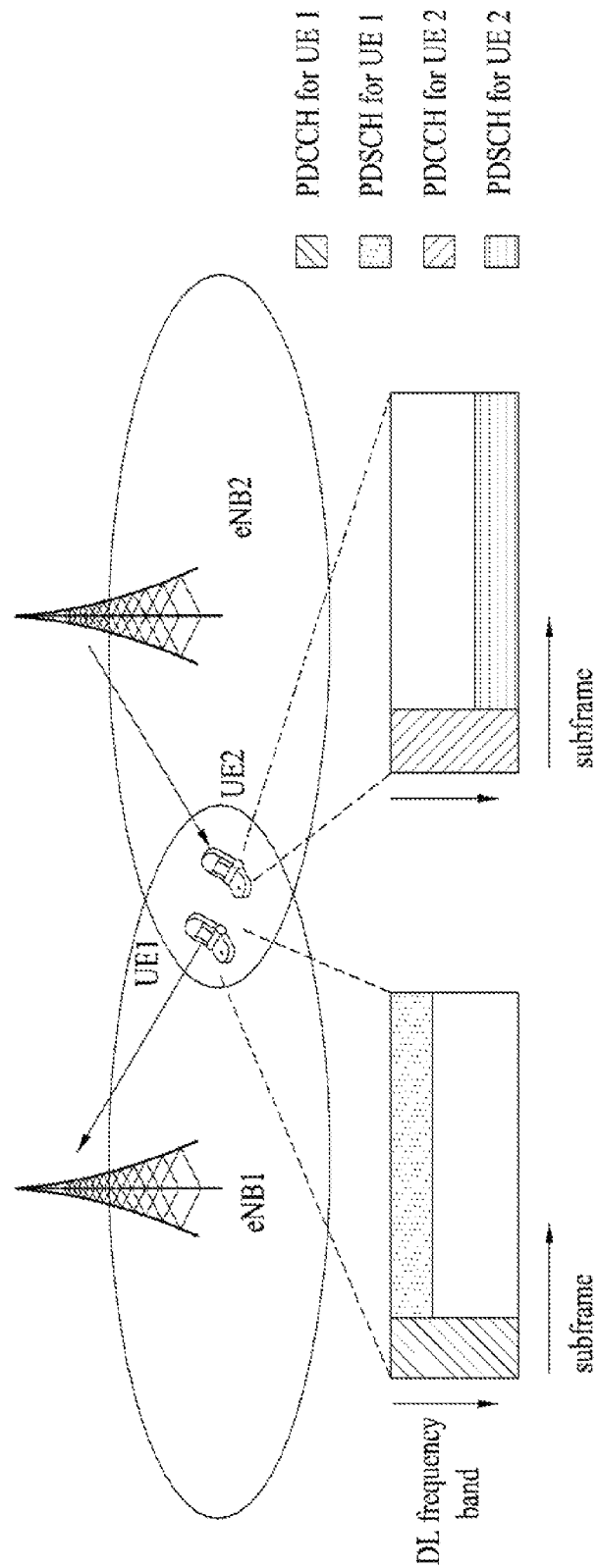
FIG. 12 is diagram illustrating a method for mitigating interference by exchanging scheduling information between eNBs.

FIG. 12 is diagram illustrating a method for mitigating interference by exchanging scheduling information between eNBs.

Referring to FIG. 12, eNB 1 transmits a PDCCH and a PDSCH to UE 1 and eNB2 transmits a PDCCH and a PDSCH to UE 2. In this case, eNB 1 and eNB 2 may exchange scheduling information such that the PDSCHs are allocated to UE 1 and UE2 on a cell boundary in orthogonal frequency regions, thereby mitigating interference. However, since the PDCCHs for UE 1 and UE 2 are transmitted over all DL bandwidths, interference cannot be mitigated even by the method for exchanging the scheduling information between the eNBs.

In addition, even when the eNBs have different UL-DL configurations, interference may occur.

Figure 13:
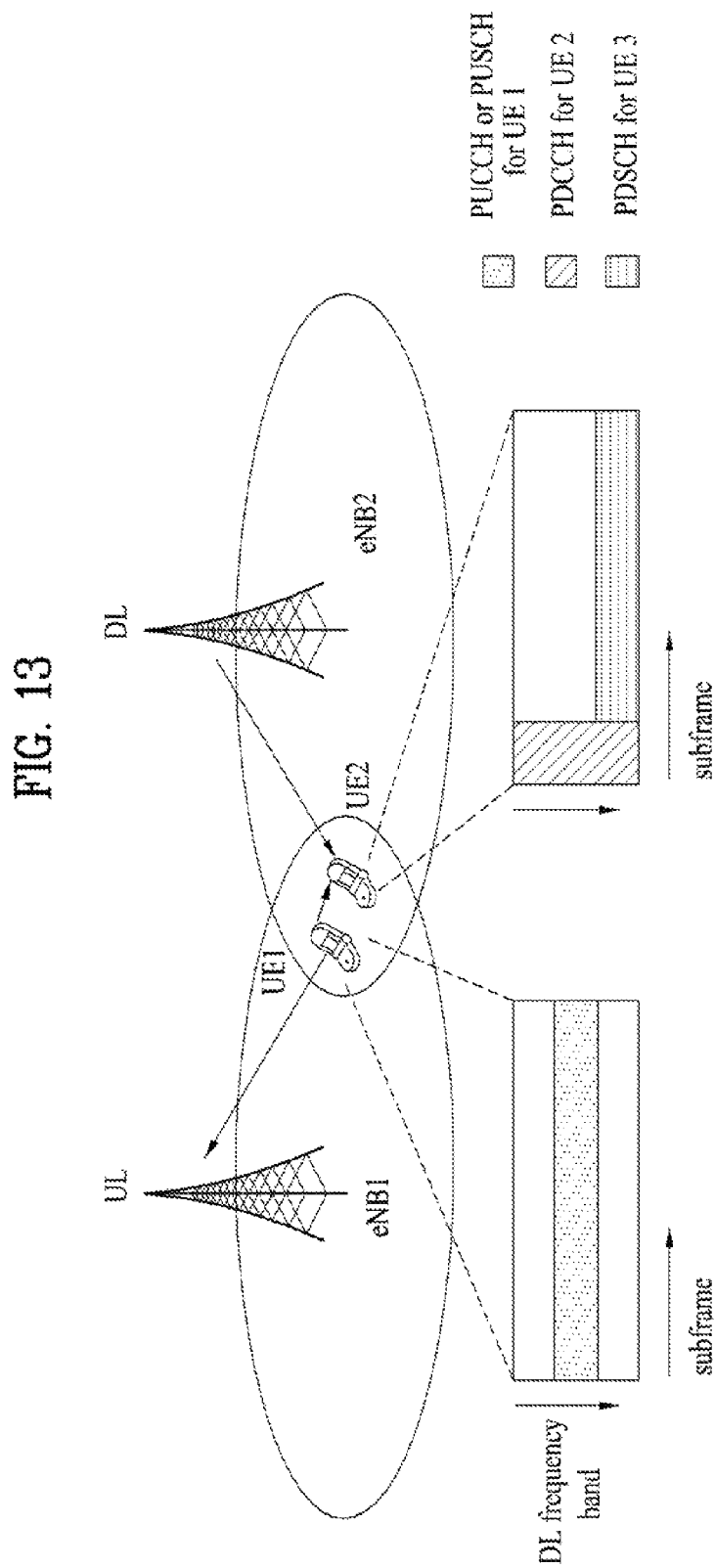
FIG. 13 is diagram illustrating a method for mitigating interference by exchanging scheduling information between eNBs when eNBs have different uplink-downlink configurations.

FIG. 13 is diagram illustrating a method for mitigating interference by exchanging scheduling information between eNBs when eNBs have different UL-DL configurations.

Referring to FIG. 13, eNB 1 receives a PUCCH or a PUSCH from UE 1 and eNB 2 transmits a PDCCH and a PDSCH to UE 2. The PUCCH or PUSCH transmitted by UE 1 may function as interference towards the PDCCH and PDSCH that UE 2 adjacent to UE 1 should receive. Even in this case, if scheduling information is exchanged between the eNBs (eNB 1 and eNB 2), interference towards the PDSCH transmitted to UE 2 may be mitigated by allocating orthogonal frequency regions to UE 1 and UE 2. That is, interference may be mitigated by allocating the PUCCH or PUSCH transmitted by UE 1 to eNB 1 and the PDSCH transmitted by eNB 2 to UE 2 in orthogonal frequency regions. However, since the PDCCH transmitted to UE 2 is transmitted over all frequency bandwidths as described before, the PDCCH may be subjected to interference by the PUCCH or PUSCH transmitted by UE 1.

Thus, since control channels (a PDCCH, a PCFICH, and a PHICH) may be transmitted in all subframes and are allocated over all DL bandwidths, interference avoidance may be difficult. Therefore, technology for mitigating or avoiding interference for the control channels is needed.

The present invention proposes a cross subframe scheduling method and an indication method therefor in order to solve the above problems.

4. Cross Subframe Scheduling

Cross subframe scheduling is a scheme for transmitting, in a PDCCH region of a subframe less influenced by interference, a PDCCH of a subframe severely influenced by interference between homogeneous eNBs or between heterogeneous eNBs. In this case, the difference in the influence of interference between subframes may be generated by scheduling load of an aggressor cell and by difference in transmit power between subframes. In addition, the difference in the influence of interference between subframes may be generated by different UL-DL configurations between neighbor eNBs.

Figure 14:
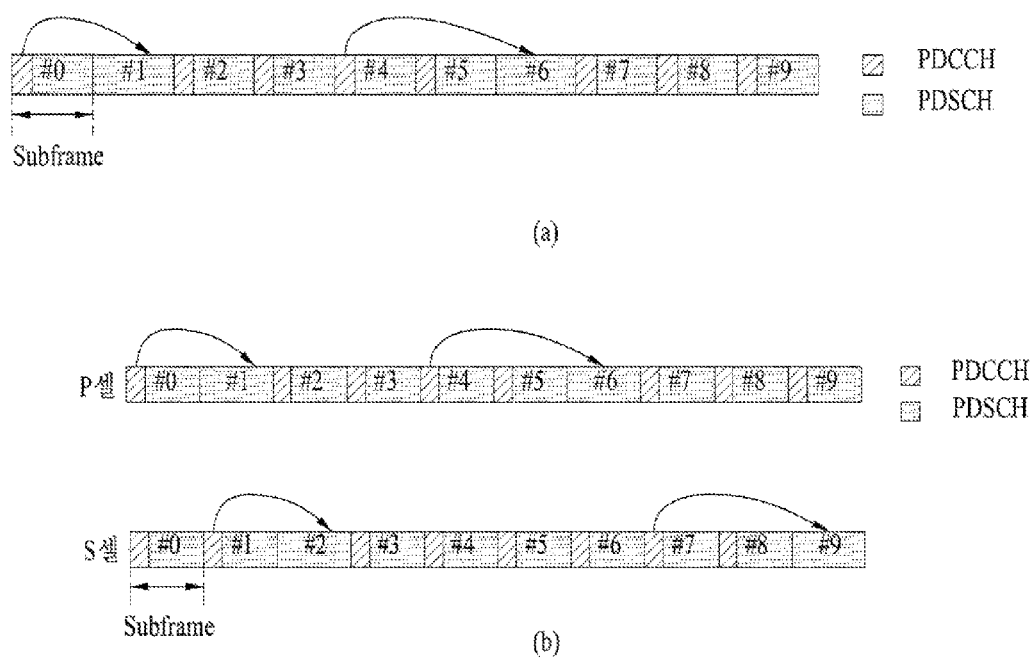
FIG. 14 is a diagram schematically illustrating the concept of cross subframe scheduling according to an embodiment of the present invention.

FIG. 14 is a diagram schematically illustrating the concept of cross subframe scheduling according to an embodiment of the present invention.

FIG. 14(a) illustrates cross subframe scheduling when a single cell is configured and FIG. 14(b) illustrates cross subframe scheduling when multiple cells are configured in a CA environment. In each cell, 10 subframes are depicted and numbers denoted in the respective subframes indicate indexes.

Referring to FIG. 14(a), cross subframe scheduling is applied in the case in which subframes #1 and #6 are greatly influenced by interference when a single cell is configured. In this case, since subframes #1 and #6 are greatly influenced by interference, a PDCCH for subframe #1 is transmitted in subframe #0 and a PDCCH for subframe #6 is transmitted in subframe #4 so that no PDCCHs may be transmitted in subframes #1 and #6. Then, PDCCHs for subframes #0 and #1 may be transmitted together in subframe #0 and PDCCHs for subframes #4 and #6 may be transmitted together in subframe #1. Consequently, a UE receives the PDCCHs for subframes #1 and #6 influenced greatly by interference in subframes (corresponding respectively to subframes #0 and #4) influenced slightly by interference, thereby improving reliability of PDCCH reception.

Such cross subframe scheduling may be equally applied to a situation in which multiple cells are configured for the UE.

Referring to FIG. 14(b), the case is illustrated in which interference greatly occurs in subframes #1 and #6 in a PCell and in subframes #2 and #9 in an SCell. PDCCHs for subframes #1 and #6 of the PCell are transmitted in subframes #0 and #4 of the PCell, respectively, and PDCCHs for subframes #2 and #9 of the SCell are transmitted in subframes #1 and #7 of the SCell, respectively, so that no PDCCHs may be transmitted in subframes #1 and #6 of the PCell and in subframes #2 and #9 of the SCell. Although an example of performing self-scheduling in the PCell and the SCell is illustrated for convenience of description in FIG. 14(b) instead of cross cell scheduling, it is apparent that both cross subframe scheduling and cross cell scheduling can be applied (or supported).

Figure 15:
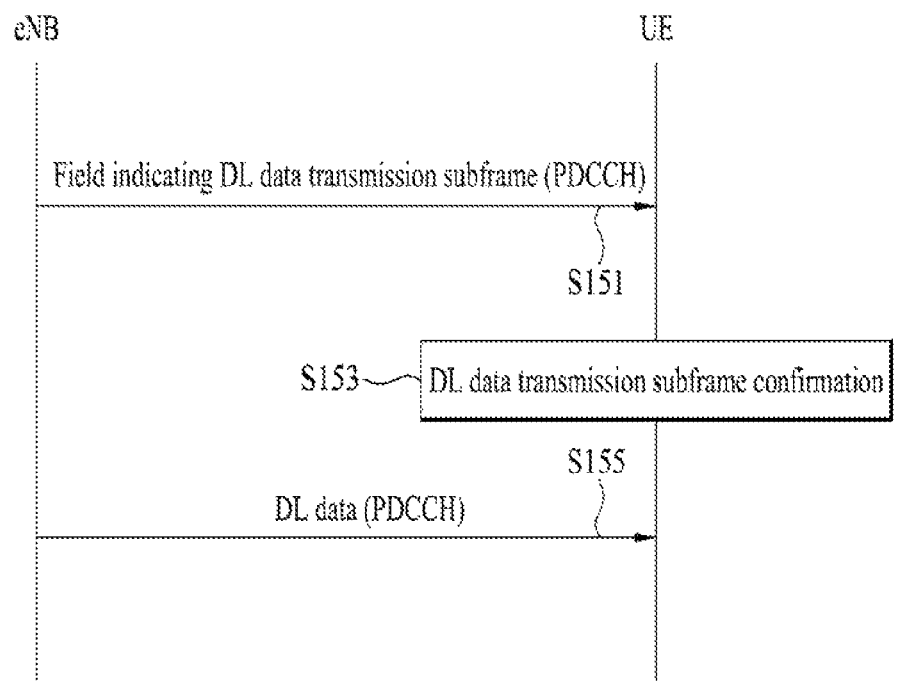
FIG. 15 is a diagram illustrating cross subframe scheduling for a downlink data channel according to an embodiment of the present invention.

FIG. 15 is a diagram illustrating cross subframe scheduling for a DL data channel according to an embodiment of the present invention.

Referring to FIG. 15, an eNB transmits a PDCCH including a field value indicating a subframe in which DL data is transmitted to a UE (S151).

Upon receiving the PDCCH from the eNB, the UE confirms a subframe in which a PDSCH associated with the PDCCH (i.e. a PDSCH according to DL resource assignment information included in the PDCCH) is transmitted through the field value included in the received PDCCH (S153). In this case, the UE may confirm the subframe in which the PDSCH associated with the PDCCH received in step S151 is transmitted using information configured through higher layer signaling (e.g. RRC signaling). The field value included in the PDCCH or the information configured through higher layer signaling may include information about a cell for transmitting the PDSCH.

Upon confirming the subframe in which the PDSCH is transmitted, the UE receives DL data transmitted through the PDSCH in the subframe (S155).

For example, in legacy LTE-A release-8/9/10, if the UE detects a PDCCH transmitted from the eNB in an n-th subframe, the UE detects (or demodulates) a PDSCH associated with the PDCCH in an (n+k)-th subframe under the assumption that the PDSCH is transmitted in the (n+k)-th subframe. Here, k=0. That is, the PDCCH and the PDSCH are transmitted in the same subframe.

However, according to cross subframe scheduling of the present invention, if the UE detects a PDCCH transmitted thereto in an n-th subframe, the UE detects (or demodulates) a PDSCH associated with the PDCCH in an (n+k+m)-th (where m>0) subframe under the assumption that the PDSCH is transmitted in the (n+k+m)-th subframe.

Although the PDCCH is exemplified for convenience of description in FIG. 15, the present invention may be equally applied even when HARQ ACK/NACK is transmitted through a PHICH. That is, if the PHICH is transmitted in an n-th subframe, the UE may detect a PDSCH associated with the PHICH in an (n+k+m)-th (where m>0) subframe under the assumption that the PDSCH is transmitted in the (n+k+m)-th subframe.

Figure 16:
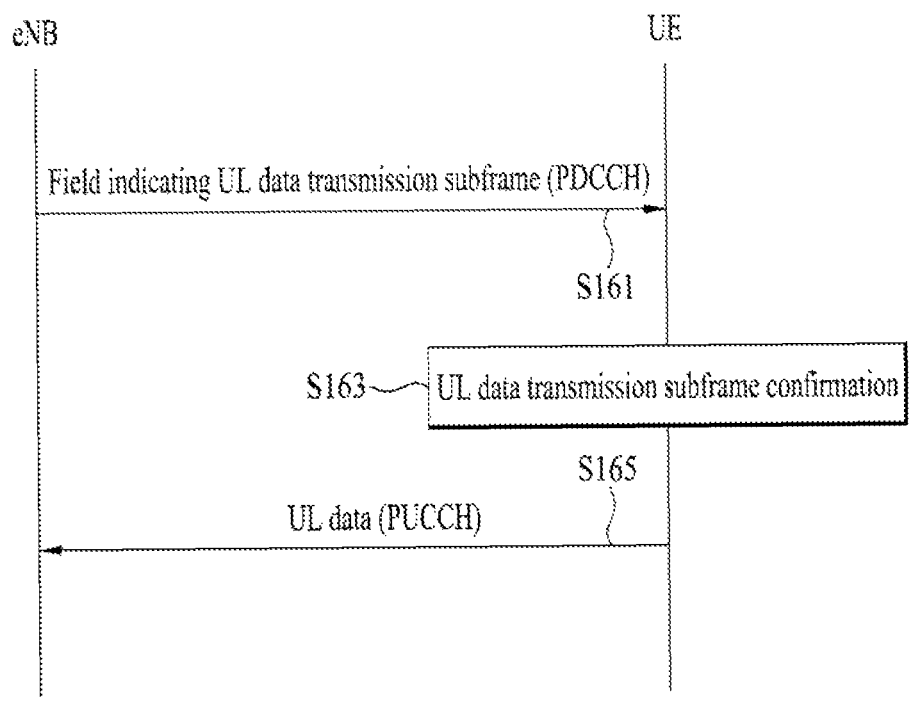
FIG. 16 is a diagram illustrating cross subframe scheduling for an uplink data channel according to an embodiment of the present invention

FIG. 16 is a diagram illustrating cross subframe scheduling for a UL data channel according to an embodiment of the present invention.

Referring to FIG. 16, an eNB transmits a PDCCH including a field value indicating a subframe in which UL data is transmitted to a UE (S161).

Upon receiving the PDCCH from the eNB, the UE confirms the subframe for transmitting a PUSCH associated with the PDCCH (i.e. a PUSCH according to UL resource assignment information included in the PDCCH) through the field value included in the received PDCCH (S163). In this case, the UE may confirm the subframe for transmitting the PUSCH associated with the PDCCH received in step S161 using information configured through higher layer signaling (e.g. RRC signaling). The field value included in the PDCCH or the information configured through higher layer signaling may include information about a cell in which the UE transmits the PUSCH.

Next, upon confirming the subframe for transmitting the PUSCH, the UE transmits UL data to the eNB through the PUSCH in the subframe (S165).

For example, in legacy LTE-A release-8/9/10, upon detecting a PDCCH transmitted from the eNB in an n-th subframe, the UE transmits a PUSCH associated with the PDCCH in an (n+k)-th subframe. While k equals 4 in an FDD system, k may differ in a TDD system, according to a TDD UL-DL configuration described earlier in Table 2 and a subframe index (or number) on which the PDCCH has been received in a frame. That is, a PUSCH transmission timing k is determined according to a subframe number on which the PDCCH has been received in a frame on a TDD UL-DL configuration basis so that the UE transmits a PUSCH associated with the PDCCH in an (n+k)-th subframe according to the transmission timing k.

However, according to cross subframe scheduling of the present invention, if the UE detects a PDCCH transmitted thereto in an n-th subframe, the UE transmits a PUSCH associated with the PDCCH in an (n+k+m)-th (where m>0) subframe. That is, the eNB detects (or demodulates) the PUSCH under the assumption that the PUSCH is transmitted in the (n+k+m)-th (where m>0) subframe.

Although the PDCCH is exemplified for convenience of description in FIG. 16, the present invention may be equally applied even when HARQ ACK/NACK is transmitted through a PHICH. That is, if the PHICH is transmitted in an n-th subframe, the UE may transmit a PUSCH associated with the PHICH in an (n+k+m)-th (where m>0) subframe and the eNB may detect the PUSCH in the (n+k+m)-th (where m>0) subframe.

Thus, to enable cross subframe scheduling, the location of a subframe of a scheduled PDSCH (or PUSCH) may be indicated through a PDCCH or higher layer signaling (RRC signaling). In this case, the location of the PDSCH (or PUSCH) subframe may be indicated by an absolute subframe index or by the location of a relative subframe based on a scheduling PDCCH. Techniques for transmitting such indication information and decoding the PDCCH will be described below.

According to an embodiment of the present invention, a PDCCH may refer to a DCI format including UL resource assignment information (UL grant) or a DCI format including DL resource assignment information (DL grant) and the present invention may be applied without limiting the format of the PDCCH. Hereinafter, for convenience of description, cross subframe scheduling for a PDCCH and a PDSCH will be described in the embodiment of the present invention. However, the present invention may be equally applied even to cross subframe scheduling for a PDCCH and a PUSCH. Further, while a PDCCH and a PDSCH, which will be mentioned hereinbelow, mean a PDCCH and a PDSCH associated with the PDCCH, they will be referred to as a PDCCH and a PDSCH, for convenience of description.

4.1. Indication Using Reserved Bits in Carrier Indication Field (CIF)

An eNB may indicate a subframe position using reserved bits of a CIF in a PDCCH to a UE. The CIF may be used for cross subframe scheduling and may also be used for cross cell scheduling in a legacy system supporting a CA environment.

4.1.1. Scheduled Subframe Indication

A CIF in a DCI format is composed of 3 bits. However, since the maximum number of configurable cells in an LTE-A system is 5, cross subframe scheduling may be supported using three reserved bits. That is, location information of a subframe for cross subframe scheduling may be designated using the three reserved bits. For example, if a subframe in which a PDCCH has been transmitted is an n-th subframe, location information may be m in an (n+k+m)-th subframe in which a PDSCH is to be transmitted. In an FDD system, k equals 0 and, in a TDD system, k may differ according to a TDD UL-DL configuration described earlier in Table 2 and a subframe index (or number) on which the PDCCH has been received in a frame.

If the number of cells configured for the UE is x, y subframe locations for cross subframe scheduling may be designated. For example, if the CIF is composed of 3 bits as described above, y (=8−x) subframe locations may be indicated. If the size of bits used for indication is n, y (=$2^n$−x) subframe locations for cross subframe scheduling may also be designated.

In this way, location information of a subframe for cross subframe scheduling, indicated through the CIF, may directly indicate m to represent a PDSCH transmitted in an (n+k+m)-th subframe for a PDCCH transmitted in an n-th subframe or may be a parameter for deriving the value m.

Table 7 shows a cross subframe scheduling configuration method using a CIF. In the example of Table 7, CIF values 0 to 4 are used as serving cell indexes (ServCellIndex) and CIF values 5 to 7 are used to indicate cross subframe scheduled subframe locations.

TABLE 7

| CIF value | Bit format | contents |
|---|---|---|
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | ServCellIndex 4 |
| 5 | 101 | 1 subframe later(or delay) (e.g., m = 1) |
| 6 | 110 | 2 subframes later(or delay) (e.g., m = 2) |
| 7 | 111 | 3 subframes later(or delay) (e.g., m = 3) |

Referring to Table 7, if a CIF value included in DCI transmitted through a PDCCH is 5, the PDCCH indicates a PDCCH for a PDSCH transmitted in the next (n+k+m)-th (where k=0 and m=1) subframe based on an n-th subframe in which the PDCCH has been received. If a CIF value included in DCI transmitted through a PDCCH is 6, the PDCCH indicates a PDCCH for a PDSCH transmitted 2 subframes later (i.e. in an (n+k+m)-th (where k=0 and m=2) subframe) based on an n-th subframe in which the PDCCH has been received. If a CIF value included in DCI transmitted through a PDCCH is 7, the PDCCH indicates a PDCCH for a PDSCH transmitted 3 subframes later (i.e. in an (n+k+m)-th (where k=0 and m=3) subframe) based on an n-th subframe in which the PDCCH has been received.

As another example, Table 8 shows a cross subframe scheduling configuration method using a CIF. In the example of Table 8, CIF values 0 to 3 are used as serving cell indexes (ServCellIndex) and CIF values 4 to 7 are used to indicate cross subframe scheduled subframe locations.

TABLE 8

| CIF value | Bit format | contents |
|---|---|---|
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | 1 subframe later(or delay) (e.g., m = 1) |
| 5 | 101 | 2 subframes later(or delay) (e.g., m = 2) |
| 6 | 110 | 3 subframes later(or delay) (e.g., m = 3) |
| 7 | 111 | 4 subframes later(or delay) (e.g., m = 4) |

Referring to Table 8, one CIF value indicating location information of a cross subframe scheduled subframe location is further added compared with Table 7. CIF values 5 to 7 in Table 7 correspond to CIF values 4 to 6 in Table 8. If a CIF value included in DCI transmitted through a PDCCH is 7, the PDCCH indicates a PDCCH for a PDSCH transmitted 4 subframes later (i.e. in an (n+k+m)-th (where k=0 and m=4) subframe) based on an n-th subframe in which the PDCCH has been received.

As still another example, Table 9 shows a cross subframe scheduling configuration method using a CIF. In the example of Table 9, CIF values 0 to 4 are used as serving cell indexes (ServCellIndex) and CIF values 5 to 7 are used to indicate cross subframe scheduled subframe locations.

TABLE 9

| CIF value | Bit format | contents |
|---|---|---|
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | ServCellIndex 4 |
| 5 | 101 | 0 subframe later(or delay) = no delay(or current subframe) (e.g., m = 0) |
| 6 | 110 | 1 subframe later(or delay) (e.g., m = 1) |
| 7 | 111 | 2 subframes later(or delay) (e.g., m = 2) |

Referring to Table 9, if a CIF value included in DCI transmitted through a PDCCH is 5, the PDCCH indicates a PDCCH (k=0 and m=0 in n+k+m) to which cross subframe scheduling is not applied. If a CIF value included in DCI transmitted through a PDCCH is 6, the PDCCH indicates a PDCCH for a PDSCH transmitted one subframe later (i.e. in an (n+k+m)-th (where k=0 and m=1) subframe) based on an n-th subframe in which the PDCCH has been received. If a CIF value included in DCI transmitted through a PDCCH is 7, the PDCCH indicates a PDCCH for a PDSCH transmitted 2 subframes later (i.e. in an (n+k+m)-th (where k=0 and m=2) subframe) based on an n-th subframe in which the PDCCH has been received.

As another example, Table 10 shows a cross subframe scheduling configuration method using a CIF. In the example of Table 10, CIF values 0 to 3 are used as serving cell indexes (ServCellIndex) and CIF values 4 to 7 are used to indicate cross subframe scheduled subframe locations.

TABLE 10

| CIF value | Bit format | contents |
|---|---|---|
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | 0 subframe later(or delay) = no delay(or current subframe) (e.g., m = 0) |
| 5 | 101 | 1 subframe later(or delay) (e.g., m = 1) |
| 6 | 110 | 2 subframes later(or delay) (e.g., m = 2) |
| 7 | 111 | 3 subframes later(or delay) (e.g., m = 3) |

Referring to Table 10, one CIF value indicating location information of a cross subframe scheduled subframe location is further added compared with Table 9. CIF values 5 to 7 in Table 9 correspond to CIF values 4 to 6 in Table 10. If a CIF value included in DCI transmitted through a PDCCH is 7, the PDCCH indicates a PDCCH for a PDSCH transmitted 3 subframes later (i.e. in an (n+k+m)-th (where k=0 and m=3) subframe) based on an n-th subframe in which the PDCCH has been received.

The above Table 7 to Table 10 illustrate examples indicating a relative location of a subframe in which a PDSCH is transmitted based on a subframe in which a PDCCH is received. However, CIF content may be configured such that a specific subframe in a radio frame is indicated (e.g. an index allocated to each subframe constituting a radio frame is indicated) instead of a relative value.

If the above-described cross subframe scheduling is operated in a wireless access system supporting a multicell (or CA) environment, the location of a cell in which a cross subframe scheduled subframe is located may be determined using the following methods.

4.1.1.1. Self-Scheduling

In a multicell (or CA) environment, the location of a cross subframe scheduled subframe using a CIF value may belong to a cell that has received a corresponding PDCCH. That is, a PDCCH including cross subframe scheduling information may be used for self-scheduling for a cell in which the PDCCH has been transmitted. In this case, if a CIF indicates cross subframe scheduling, carrier indication may implicitly have 0 or may implicitly indicate an index of a cross subframe scheduled cell (i.e. a cell in which a PDCCH has been transmitted).

Figure 17:
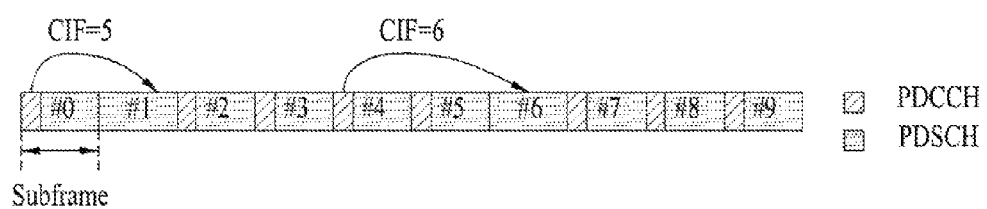
FIG. 17 is a diagram illustrating a cross subframe scheduling method according to an embodiment of the present invention.

FIG. 17 is a diagram illustrating a cross subframe scheduling method according to an embodiment of the present invention. In FIG. 17, the above Table 7 is used for cross subframe scheduling.

Referring to FIG. 17, since a PDCCH including cross subframe scheduling information may be used for self-scheduling for a cell in which the PDCCH has been transmitted, a PDCCH having CIF=5 in subframe #0 indicates subframe #1 of a cell in which the PDCCH has been transmitted and a PDCCH having CIF=6 in subframe #4 indicates subframe #6 of a cell in which the PDCCH has been transmitted.

4.1.1.2. Serving Cell Index Pre-Designation

If a CIF is used for cross subframe scheduling, a scheduled cell index (or carrier indication) may be pre-designated through higher layer signaling, for example, RRC configuration. More specifically, if a cell index (or carrier indication) for cross subframe scheduling is configured in a specific PCell or SCell, a subframe indicated by a CIF means a cross subframe scheduled subframe in a corresponding cell configured for the purpose of cross cell scheduling. Accordingly, a cross subframe scheduling scheme using the CIF may be simultaneously performed with cross cell scheduling. For example, if a PDCCH is transmitted in an n-th subframe, cross subframe scheduling information indicated by the CIF may be a value m indicating a PDSCH in an (n+k+m)-th subframe of a cell configured by higher layer signaling or may be a parameter for deriving the value m.

Figure 18:
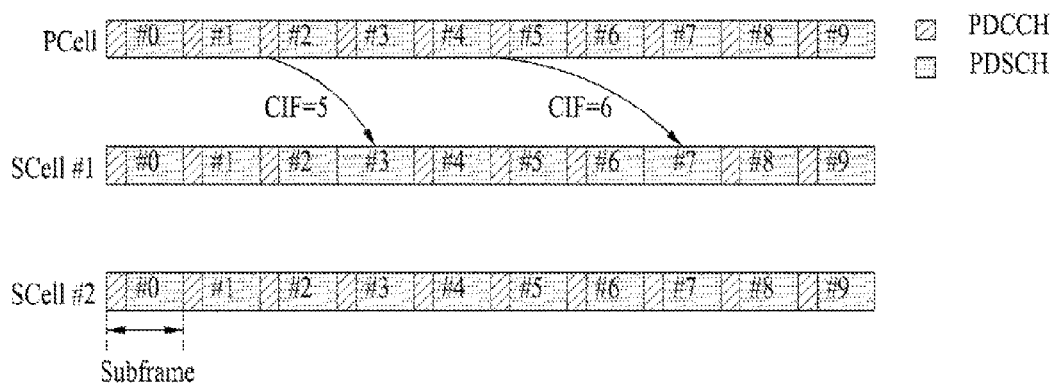
FIG. 18 is a diagram illustrating a cross subframe scheduling method according to an embodiment of the present invention.

FIG. 18 is a diagram illustrating a cross subframe scheduling method according to an embodiment of the present invention. In the example of FIG. 18, the above Table 7 is used for cross subframe scheduling when a cross cell scheduled cell index (or carrier indication) is configured as SCell #1.

Referring to FIG. 18, a PDCCH having CIF=5 transmitted in subframe #2 of a PCell indicates subframe #3 of SCell #1 and a PDCCH having CIF=6 transmitted in subframe #5 of the PCell indicates subframe #7 of SCell #1.

4.1.1.3. Subframe Index Pre-Designation

If a CIF is used for cross cell scheduling unlike the above embodiment, a scheduled subframe (or a subframe index) may be pre-designated through higher layer signaling, for example, RRC configuration. More specifically, if a subframe for cross subframe scheduling is configured as a specific subframe in one radio frame or as a subframe separated by a prescribed number of subframes based on a subframe in which a corresponding PDCCH has been received, a CIF may mean a serving cell index (ServCellIndex) on which cross subframe scheduling is performed. Accordingly, a cross subframe scheduling scheme using the CIF may be simultaneously performed with cross cell scheduling. For example, if a PDCCH is transmitted in an n-th subframe, cross subframe scheduling information indicated through RRC configuration may be a value m indicating a PDSCH in an (n+k+m)-th subframe or may be a parameter for deriving the value m.

In this case, PDCCHs having partial specific values of a CIF may indicate PDCCHs used only for cross cell scheduling and PDCCHs having the other values of the CIF may indicate PDCCHs used for cross subframe scheduling in a cell (i.e. a cross cell scheduled cell) indicated by a CIF value. That is, cross subframe scheduling may be used together with cross cell scheduling only when a subframe index for cross subframe scheduling configured by higher layer signaling has any specific value among all values of the CIF.

Figure 19:
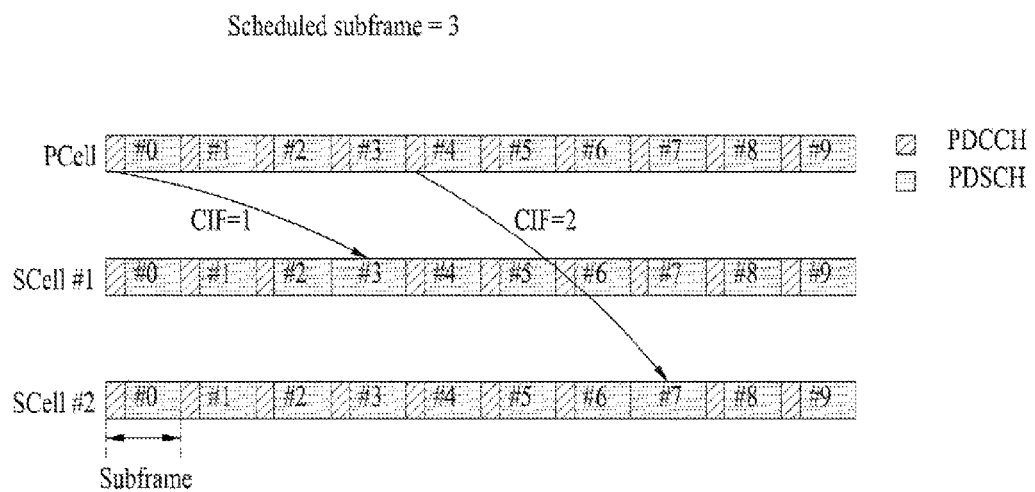
FIG. 19 is a diagram illustrating a cross subframe scheduling method according to an embodiment of the present invention.

FIG. 19 is a diagram illustrating a cross subframe scheduling method according to an embodiment of the present invention. In FIG. 19, a subframe for cross subframe scheduling is configured to indicate an (n+k+m)-th (where k=0 and m=3) subframe which is a subframe after three subframes from an n-th subframe in which a PDCCH has been received.

Referring to FIG. 19, a PDCCH having CIF=1 transmitted in subframe #0 of a PCell indicates subframe #3 of SCell #1 and a PDCCH having CIF=2 transmitted in subframe #4 of the PCell indicates subframe #7 of SCell #2.

4.1.2. Scheduled Cell and Subframe Indication

As described above, since the maximum number of configurable cells in an LTE-A system is 5 although a CIF in a DCI format is composed of 3 bits, cross subframe scheduling may be supported using three reserved bits. That is, location information of a cross subframe scheduled subframe is designated using the three reserved bits. Unlike the afore-described examples, in this embodiment, a serving cell index of a cross cell scheduled cell, which is an original function of a CIF, may be additionally designated together with location information of a cross subframe scheduled subframe.

Hereinafter, the meaning of 'a CIF is configured' is the same as the meaning of 'cross cell scheduling is supported'. That is, a scheduling cell is equal to or different from a scheduled cell according to a CIF value. Meanwhile, the meaning of 'a CIF is not configured' is the same as the meaning of 'cross cell scheduling is not supported', i.e., indicating that a scheduling cell is always the same as a scheduled cell without the need of interpreting the CIF and a CIF may not be transmitted.

4.1.2.1. Case in which Whether CIF is Configured is not Considered

Since a conventional CIF is used for cross cell scheduling, cross subframe scheduling is performed using only reserved bits (or unused bits) of the CIF irrespective of whether the CIF is configured in order to prevent influence on cross cell scheduling. In this case, information transmitted to a UE using the CIF includes a serving cell index for cross cell scheduling as well as location information of a subframe for cross subframe scheduling. The location information of the subframe may be a value m when a PDSCH is transmitted in an (n+k+m)-th subframe in the case where a PDCCH has been transmitted in an n-th subframe. In addition, location information of the subframe (e.g. a value m in n+k+m) may be configured to apply the same value to all cross subframe scheduling and may be indicated through higher layer signaling (e.g. RRC configuration). When the location information is indicated by higher layer signaling, the same value in all cells may be indicated or a different value per cell may be indicated.

Table 11 shows a cross cell scheduling and cross subframe scheduling configuration method using a CIF. In Table 11, CIF values 0 to 4 are used as serving cell indexes (ServCellIndex) for cross cell scheduling and CIF values 5 to 7 are used to indicate serving cell indexes for cross cell scheduling and the locations of cross subframe scheduled subframes. In Table 11, for CIF values 0 to 4, cross subframe scheduling is not applied and m=0.

TABLE 11

| CIF value | Bit format | contents |
| --- | --- | --- |
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | ServCellIndex 4 |
| 5 | 101 | ServCellIndex 0 & 1 subframe later(or delay) (e.g., m = 1) |
| 6 | 110 | ServCellIndex 1 & 1 subframe later(or delay) (e.g., m = 1) |
| 7 | 111 | ServCellIndex 2 & 1 subframe later(or delay) (e.g., m = 1) |

Referring to Table 11, a CIF value of 5, 6, or 7 indicates a serving cell index (ServCellIndex) for cross cell scheduling and a value m indicating a subframe for cross subframe scheduling. More specifically, if a CIF value included in DCI transmitted through a PDCCH is 5, this indicates that a PDSCH is transmitted with one subframe delay based on an n-th subframe in which the PDCCH has been received in a cell having serving cell index 0. If a CIF value included in DCI transmitted through a PDCCH is 6, this indicates that a PDSCH is transmitted with one subframe delay based on an n-th subframe in which the PDCCH has been received in a cell having serving cell index 1. If a CIF value included in DCI transmitted through a PDCCH is 7, this indicates that a PDSCH is transmitted with one subframe delay based on an n-th subframe in which the PDCCH has been received in a cell having serving cell index 2.

Nonetheless, it may be difficult to apply cross subframe scheduling in all cells by such a configuration. However, LTE-A release-10 is a system designed to optimize support for up to two cells in spite of actual support for 5 cells and may efficiently support cross subframe scheduling in terms of optimization for up to two cells. In addition, since a time delay of a subframe (e.g. a value m in n+k+m) serves to avoid the influence of interference between neighboring cells, many time delay values (a plurality of values m) may not be needed. For example, even if only cross subframe scheduling of m=1 is supported, it is possible to reduce PDCCH transmission in half DL subframes. Accordingly, even when cross subframe scheduling is supported with a fixed delay value of a less number (e.g. one m value), an effect thereof can be sufficiently obtained.

As another example, Table 12 shows a cross cell scheduling and cross subframe scheduling configuration method using a CIF. In Table 12, CIF values 0 to 4 are used to indicate serving cell indexes (ServCellIndex) for cross cell scheduling and CIF values 5 to 7 are used to indicate serving cell indexes for cross cell scheduling and the locations of subframes for cross subframe scheduling. In Table 12, for CIF values 0 to 4, cross subframe scheduling is not applied and m=0.

TABLE 12

| CIF value | Bit format | contents |
| --- | --- | --- |
| 0 | 000 | ServCellIndex 0 |
| 1 | 001 | ServCellIndex 1 |
| 2 | 010 | ServCellIndex 2 |

TABLE 12-continued

| CIF value | Bit format | contents |
| --- | --- | --- |
| 3 | 011 | ServCellIndex 3 |
| 4 | 100 | ServCellIndex 4 |
| 5 | 101 | ServCellIndex 0 & 1 subframe later(or delay) (e.g., m = 1) |
| 6 | 110 | ServCellIndex 0 & 2 subframes later(or delay) (e.g., m = 2) |
| 7 | 111 | ServCellIndex 1 & 1 subframe later(or delay) (e.g., m = 1) |

Table 12 is a modified example of Table 11 and illustrates an example of applying cross subframe scheduling for up to two cells in terms of optimization for up to two cells as described in the above Table 11. Hereinafter, it is assumed that a cell, a serving cell index of which is 0, is a PCell.

If three types of information for CIF values 5 to 7 are applied to two cells, two types of information among the three types of information may be used for the PCell and the other type of information may be used for an SCell. On the contrary, one type of information may be used for the PCell and the other two types of information may be used for the SCell. Through this, a time delay in a subframe caused by cross subframe scheduling can be greatly adjusted in a cell in which scheduling is frequently performed.

Referring to Table 12, if a CIF value included in DCI transmitted through a PDCCH is 5, this indicates that a PDSCH is transmitted with one subframe delay based on an n-th subframe in which the PDCCH has been received in a cell having serving cell index 0. If a CIF value included in DCI transmitted through a PDCCH is 6, this indicates that a PDSCH is transmitted with a two-subframe delay based on an n-th subframe in which the PDCCH has been received in a cell having serving cell index 0. If a CIF value included in DCI transmitted through a PDCCH is 7, this indicates that a PDSCH is transmitted with one subframe delay based on an n-th subframe in which the PDCCH has been received in a cell having serving cell index 1.

As shown in the above Table 10 or Table 11, a UE can apply cross subframe scheduling by efficiently using a CIF irrespective of whether the a CIF is configured.

Meanwhile, RRC configuration for cross subframe scheduling may be applied together with the above-described method or only the above-described method may be applied without applying RRC configuration for cross subframe scheduling.

4.1.2.2. Case in which Whether CIF is Configured is Considered

If cross subframe scheduling is applied irrespective of whether a CIF is configured as in the above-described embodiment, it may be difficult to provide much information due to restrictions in the number of bits for applying cross subframe scheduling. Accordingly, a CIF for cross subframe scheduling may be differently configured depending upon whether the CIF is configured.

If the CIF is configured, the CIF may be configured as in the embodiment described in section (4.1.2.1.). That is, cross subframe scheduling may be performed only using reserved bits (or unused bits) of the CIF without affecting cross cell scheduling.

Meanwhile, if the CIF is not configured, all values 0 to 7 of the CIF may be used to transmit information for cross subframe scheduling. For example, option 1 or option 2 of CIF content shown below in Table 15 may be applied.

Through such a method, if the CIF is configured, use of a cross subframe is restricted not to hinder cross cell scheduling and, if the CIF is not configured, use of the CIF for cross subframe scheduling is extended so as to efficiently perform cross subframe scheduling.

Meanwhile, RRC configuration for cross subframe scheduling may be applied together with the above-described method or only the above-described method may be applied without applying RRC configuration for cross subframe scheduling.

While the cross subframe scheduling methods using a CIF value have been described and CIF values and indication information according to the CIF values have been illustrated hereinabove, CIF values different from the CIF values described in the above embodiment of section (4.1.1.) or (4.1.2.) may be used to indicate cross subframe scheduling and subframe locations indicated by the CIF values used for cross subframe scheduling may be differently configured. For example, if the CIF value is 6 in Table 7, this may be configured to indicate a subframe received 6 subframes later, rather than 2 subframes later, based on a subframe in which a PDCCH has been received. In this case, the location of a subframe indicated by each CIF value may be signaled to the UE through cell-specific or semi-static RRC signaling.

4.2. Definition of Subframe Indication Field (SIF)

Unlike the method using a CIF value for cross subframe scheduling in section (4.1.), an indication bit for cross subframe scheduling in a PDCCH may be newly allocated. Hereinafter, while such an indication bit will be referred to as a subframe indication field (SIF), the bit may be defined as another name.

If an SIF is configured, a UE may perform monitoring in a USS to decode a PDCCH. In this case, since a CSS is a region in which legacy UEs or UEs having other capabilities perform monitoring together, the PDCCH may be restricted to be transmitted through the USS instead of the CSS with respect to DCI formats including a configured SIF.

That is, the UE performs monitoring in a CSS to decode the PDCCH having no SIF. For a serving cell in which a PDCCH is monitored, a UE for which an SIF is not configured performs monitoring in a USS for a PDCCH without the SIF. On the other hand, a UE for which an SIF is configured performs monitoring in a USS for a PDCCH including the SIF. If the UE is configured to monitor a PDCCH including an SIF according to an SCell in a serving cell other than an SCell, the UE does not monitor the PDCCH in the SCell. For a serving cell in which the PDCCH is monitored, the UE monitors PDCCH candidates at least for the same serving cell. A UE configured with an SIF for a serving cell and configured to monitor PDCCH candidates CRC-scrambled by a C-RNTI having a common payload size and having the same first CCE index $n_{CCE}$ (i.e. the smallest CCE index used to configure the PDCCH) in a CSS and a USS may assume that only the PDCCH in the CSS is transmitted through a PCell. In addition, the UE configured to monitor PDCCH candidates with a DCI format size including an SIF in a serving cell and CRC-scrambled by a C-RNTI may assume that PDCCH candidates having a DCI format size are transmitted in a USS corresponding to any of possible SIF values according to DCI format size through a configured serving cell. Here, PDCCH candidates may include one or more possible SIF values according to a determined DCI format size.

The above SIF may be composed of one or more bits. Therefore, if the size of the SIF is x and the size of bits of a conventional DCI format is n, the size of bits of a DCI format for performing cross subframe scheduling may be (n+x) bits.

4.2.1. Case in which SIF is One Bit

If the SIF is composed of one bit, 0 may indicate or trigger a PDCCH for which cross subframe scheduling is not performed (i.e. non-cross subframe scheduling (non-CSS)) and 1 may indicate or trigger a PDCCH for cross subframe scheduling, or vice versa.

In addition, if the UE receives a PDCCH for cross subframe scheduling, the PDCCH may indicate a subframe of a specific location (i.e. the next subframe) based on a subframe in which the PDCCH has been received or indicate the location of a subframe in a pre-configured radio frame based on an eNB. Alternatively, the location of a subframe or delay information (e.g. a value m in n+k+m) based on an n-th subframe in which the PDCCH has been received may be semi-statically indicated to the UE through RRC signaling.

4.2.2. Case in which SIF is One or More Bits

If an SIF is composed of one bit or more, the bits may include not only a bit for indicating or triggering a PDCCH for cross subframe scheduling but also location information (e.g. a value m in n+k+m) of a subframe indicated by the PDCCH. For example, if the SIF is composed of two bits, the bits may be used to indicate a maximum of three subframes in a radio frame or delay information (e.g. a value m in n+k+m) of a subframe based on an n-th subframe in which the PDCCH has been received.

Table 13 indicates a cross subframe scheduling configuration method using an SIF.

TABLE 13

| SIF bits | Direct mapping method | RRC configured method |
|---|---|---|
| 00 | Non CSS | Non CSS |
| 01 | 1 subframe later (or delay) (e.g., m = 1) | 1st RRC configured parameter (e.g., number of subframe later (or delay), m) |
| 10 | 2 subframes later (or delay) (e.g., m = 2) | 2nd RRC configured parameter (e.g., number of subframe later (or delay), m) |
| 11 | 3 subframes later (or delay) (e.g., m = 3) | 3rd RRC configured parameter (e.g., number of subframe later (or delay), m) |

Referring to FIG. 13, a direct mapping method and an RRC configured method according to a bit value of an SIF are illustrated.

First, the direct mapping method serves to obtain location information (e.g. a value m in n+k+m) of a subframe for cross subframe scheduling using only a PDCCH received by the UE. That is, an SIF may be used to indicate how many subframes later (e.g. a value m in n+k+m) a subframe is located based on an n-th subframe in which a PDCCH has been received or indicate a specific subframe in one radio frame or delay information (e.g. a value m in n+k+m) of the subframe. More specifically, if a bit value of an SIF included in DCI transmitted through a PDCCH is 00, this indicates that cross subframe scheduling is not performed, and if a bit value of an SIF included in DCI transmitted through a PDCCH is 01, 10, or 11, this indicates a PDSCH transmitted with a 1-subframe, 2-subframe, or 3-subframe delay, respectively, based on an n-th subframe in which the PDCCH has been received.

For semi-static operation, the RRC configured method may be used. That is, the location of a subframe or delay information (a value m in n+k+m) of a subframe, indicated by an SIF, may mean a subframe or delay information (e.g. a value m in n+k+m) of the subframe configured by RRC signaling. Specifically, if a bit value of the SIF included in DCI transmitted through a PDCCH is 00, this indicates that cross subframe scheduling is not performed and, if a bit value of the SIF transmitted through RRC signaling is 01, this indicates a PDSCH transmitted in a subframe after the first RRC configuration parameter value (m) transmitted through RRC signaling based on an n-th subframe in which the PDCCH has been received. If a bit value of the SIF transmitted through RRC signaling is 10 or 11, this indicates a PDSCH transmitted in a subframe after the second or third RRC configuration parameter value (m), respectively, transmitted through RRC signaling based on an n-th subframe in which the PDCCH has been received.

As another example, Table 14 illustrates a cross subframe scheduling configuration method using an SIF.

TABLE 14

| SIF bits | Direct mapping method | RRC configured method |
| --- | --- | --- |
| 00 | Non CSS = no delay (or current subframe) (e.g., m = 0) | 1st RRC configured parameter (e.g., number of subframe later (or delay), m = 0 or 1 or 2 or 3) |
| 01 | 1 subframe later (or delay) (e.g., m = 1) | 2nd RRC configured parameter (e.g., number of subframe later (or delay), m = 0 or 1 or 2 or 3) |
| 10 | 2 subframes later (or delay) (e.g., m = 2) | 3rd RRC configured parameter (e.g., number of subframe later (or delay), m = 0 or 1 or 2 or 3) |
| 11 | 3 subframes later (or delay) (e.g., m = 3) | 4th RRC configured parameter (e.g., number of subframe later (or delay), m = 0 or 1 or 2 or 3) |

Referring to Table 14, while an SIF is composed of two bits as in Table 13, information indicated in a direct mapping method and an RRC configured method may be differently configured according to each bit value of the SIF.

4.3. Use of all Bits of Carrier Indication Field (CIF)

An eNB may previously indicate or configure whether a CIF in a DCI format is for cross subframe scheduling or for cross cell scheduling, through RRC signaling. That is, a UE may previously receive information as to whether the CIF in a PDCCH obtained from the eNB is used as an indication bit for cross subframe scheduling or as a serving cell index (ServCellIndex) for cross cell scheduling, through RRC signaling. Accordingly, the UE may obtain control channel information suitable for a scheduling purpose using a CIF value in the received PDCCH and all CIF values may be used as indication bits for cross cell scheduling or cross subframe scheduling.

Table 15 shows a cross subframe scheduling configuration method using all CIF values. In Table 15, cross subframe scheduling is configured through RRC signaling.

TABLE 15

| CIF value | Bit format | Contents option #1 | Contents option #2 |
| --- | --- | --- | --- |
| 0 | 000 | 1 subframe later (or delay) (e.g., m = 1) | 0 subframe later (or delay) = no delay (or current subframe) (e.g., m = 0) |
| 1 | 001 | 2 subframes later (or delay) (e.g., m = 2) | 1 subframe later (or delay) (e.g., m = 1) |
| 2 | 010 | 3 subframes later (or delay) (e.g., m = 3) | 2 subframes later (or delay) (e.g., m = 2) |
| 3 | 011 | 4 subframes later (or delay) (e.g., m = 4) | 3 subframes later (or delay) (e.g., m = 3) |
| 4 | 100 | 5 subframes later (or delay) (e.g., m = 5) | 4 subframes later (or delay) (e.g., m = 4) |
| 5 | 101 | 6 subframes later (or delay) (e.g., m = 6) | 5 subframes later (or delay) (e.g., m = 5) |
| 6 | 110 | 7 subframes later (or delay) (e.g., m = 7) | 6 subframes later (or delay) (e.g., m = 6) |
| 7 | 111 | 8 subframes later (or delay) (e.g., m = 8) | 7 subframes later (or delay) (e.g., m = 7) |

Referring to Table 15, a subframe location or subframe delay information (e.g. a value m in n+k+m) indicated by each CIF value may be configured. In this case, only delayed information (e.g. a value m in n+k+m where m>0) based on a subframe in which a PDCCH has been received may be configured as shown in option #1 or non-delay information (e.g. a value m in n+k+m where m>0) may be configured in addition to the delayed information as shown in option #2.

Meanwhile, information indicated by each CIF value (or bit) or each SIF value (or bit) shown in each table (table 7 to table 15) described above are purely exemplary and the information indicated by each CIF or SIF value may be changed. For example, information indicated by each CIF per cell may be different and information indicated by each CIF according to time may be different, even with respect to the same CIF value.

5. TDD Based Cross Scheduling

In cross subframe scheduling about UL/DL in the above TDD UL/DL configurations, each of DL and UL subframes may be numbered and indicated or all subframes may be numbered and indicated. That is, through reserved bits except for a CIF in a DCI format or through an available field in the DCI format, an offset for cross subframe scheduling regarding a plurality of subframes may be designated.

5.1. Numbering and Indication about Each of UL/DL Subframes

A relative offset value may be designated and used for subframe scheduling.

If a UE performs cross subframe scheduling in a DL situation of configuration 1, n=0, and k+m=2, then an offset for two DL subframes is designated and it may be assumed that PDCCH information about the UE in subframe 5 is scheduled in subframe 0.

5.2. Numbering and Indication about all DL/DL Subframes

As described in the above embodiments, if an offset for all subframes is designated, a UE performs cross subframe scheduling in a DL situation of configuration 6, n=0, and k+m=5, then it may be assumed that a PDCCH of the UE in DL of subframe 5 based on subframe 0 is scheduled in subframe 0.

6. Cross Scheduling of PDCCH Information for Multiple Subframes in One Subframe

Figure 20:
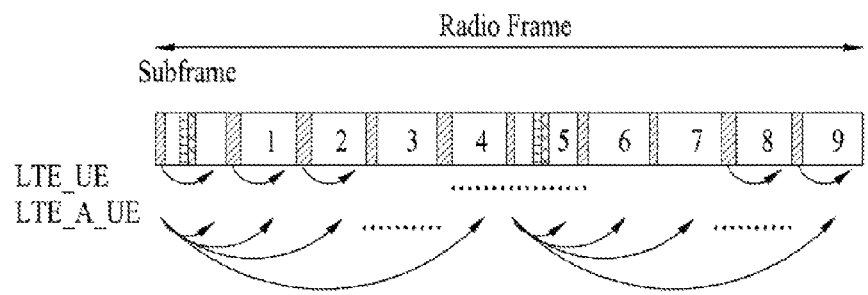
FIG. 20 is a diagram illustrating cross subframe scheduling method for multiple subframes according to an embodiment of the present invention.

FIG. 20 is a diagram illustrating a cross subframe scheduling method for multiple subframes according to an embodiment of the present invention.

Referring to FIG. 20, in the present invention, indication information indicates not only cross subcarrier scheduling for one subframe but also the period and number of valid subframes so that PDCCH information about multiple subframes may be cross-scheduled in one subframe. FIG. 20 illustrates a related embodiment wherein an LTE-A UE indicates an advanced UE permitting cross subframe scheduling and an LTE UE receives indication about a subframe corresponding to k+m=0 through a PDCCH of the subframe.

7. Cross Subframe Scheduling and PDCCH Resource Arrangement According to Modulation and Coding Scheme (MCS) Level In order to solve a problem in which an inaccurate MCS level caused by a channel change hinders reliable data detection, especially, a problem of generating serious restrictions in TDD, and a problem incapable of using a legacy UE for cross subframe scheduling in the case in which a PDSCH corresponding to a cross scheduled PDCCH is allocated after a few subframes during cross subframe scheduling, the present invention may be extended as the following scheme in addition to the purpose of interference mitigation by emptying all PDCCH regions.

Figure 21:
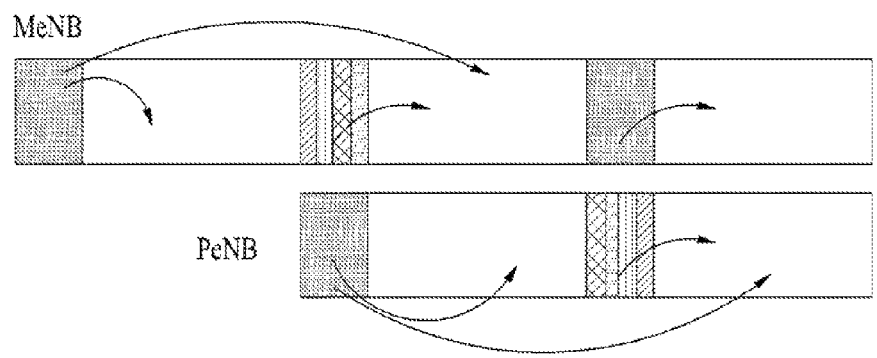
FIG. 21 is a diagram illustrating a cross subframe scheduling method for a subframe using an MCS level according to an embodiment of the present invention.

FIG. 21 is a diagram illustrating a cross subframe scheduling method for a subframe using an MCS level according to an embodiment of the present invention.

Referring to FIG. 21, a UE which is sensitive to an actual MSC level because of a relatively high MSC level transmits information of a PDCCH in a control region by raising a PDCCH aggregation level and boosting power. A UE which is relatively insensitive to the MCS level performs subframe scheduling for the information of the PDCCH. Each UE informs the eNB of the MCS level thereof.

If the MCS level is high, performance degradation may occur in the case in which an actual channel is greatly changed. Therefore, an effect of reducing interference can be obtained by excluding cross subframe scheduling when the MCS level is high and by performing cross subframe scheduling when the MCS level is low. A UE located at the center of a cell uses high modulation order and low channel coding because there is little channel change. A UE located at a cell boundary uses low modulation order and high channel coding because there is great channel change.

Figure 22:
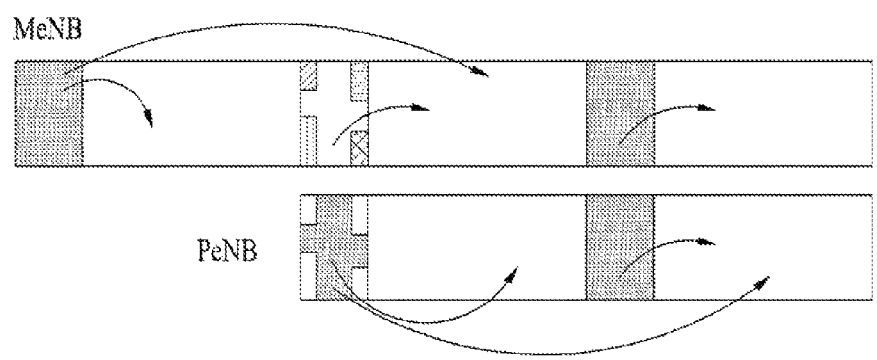
FIG. 22 is a diagram illustrating a cross subframe scheduling method for a subframe in accordance with orthogonal arrangement of a PDCCH according to an embodiment of the present invention.

FIG. 22 is a diagram illustrating a cross subframe scheduling method for a subframe in accordance with orthogonal arrangement of a PDCCH according to an embodiment of the present invention.

Referring to FIG. 22, interference can be mitigated by orthogonally arranging resources between PDCCHs based on a cell ID using the fact that PDCCH regions are sparse.

8. Overview of Device to which the Present Invention is Applicable

Figure 23:
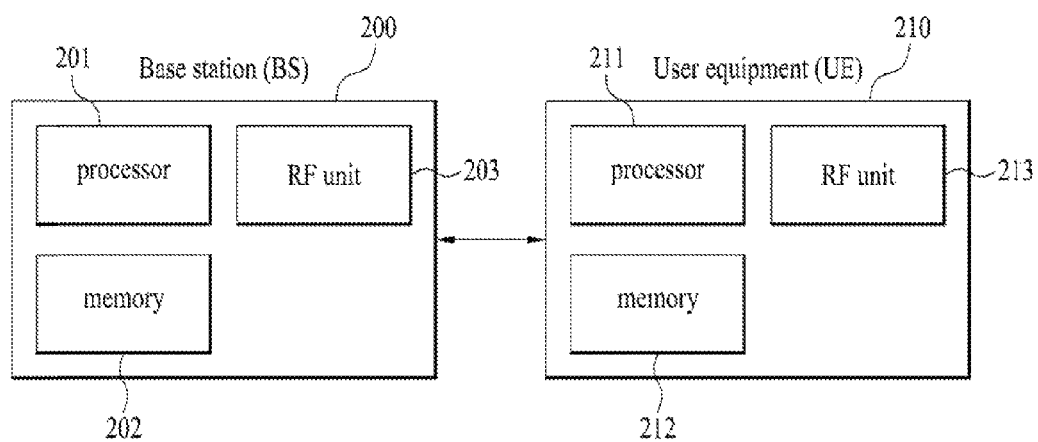
FIG. 23 is a block diagram of a wireless communication device according to an embodiment of the present invention.

FIG. 23 is a block diagram of a wireless communication device according to an embodiment of the present invention.

Referring to FIG. 23, the wireless communication system includes a BS 200 and a plurality of UEs 210 located in the area of the BS 200.

The BS 200 includes a processor 201, a memory 202, and a radio frequency (RF) unit 203. The processor 201 carries out proposed functions, processes, and/or methods. Layers of a radio interface protocol may be achieved by the processor 201. The memory 202 is connected to the processor 201 and stores a variety of information for driving the processor 201. The RF unit 203 is connected to the processor 201 and transmits and/or receives a radio signal.

The UE 210 includes a processor 211, a memory 212, and an RF unit 213. The processor 211 carries out proposed functions, processes, and/or methods. Layers of a radio interface protocol may be achieved by the processor 211. The memory 212 is connected to the processor 211 and stores a variety of information for driving the processor 211. The RF unit 213 is connected to the processor 211 and transmits and/or receives a radio signal.

The memories 202 and 212 may be located at the interior or exterior of the processor 201 and 211, respectively, and may be connected to the processors 201 and 211, respectively, by a well-known means. The BS and/or the UE 210 may include a single antenna or multiple antennas.

The embodiments described hereinabove are combinations of elements and features of the present invention in prescribed forms. The elements or features may be considered selective unless otherwise mentioned. Each element or feature may be practiced without being combined with other elements or features. In addition, some elements and/or features may be combined with one another to constitute the embodiments of the present invention. Operation orders described in embodiments of the present invention may be rearranged. Some elements or features of one embodiment may be included in another embodiment or may be replaced with corresponding elements or features of another embodiment. Claims which are not explicitly dependent on each other may be combined to provide the embodiments or new claims may be added through amendment after this application is filed.

The above-described embodiments of the present invention may be achieved by various means, for example, hardware, firmware, software, or a combination thereof. In a hardware configuration, the methods according to the embodiments of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, the method according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein. Claims which are not explicitly dependent on each other may be combined to provide the embodiments or new claims may be added through amendment after this application is filed.

[Industrial Applicability]

While the above-described data transmission/reception method of the present invention in a wireless access system has been described as an example applied to the 3GPP LTE system, the method is applicable to various wireless access systems as well as the 3GPP LTE system.

The invention claimed is:

1. A method for transmitting data at a base station (BS) in a wireless access system, the method comprising:
   transmitting, to a user equipment (UE), a Radio Resource Control (RRC) signal indicating whether each one of a plurality of carrier indication field (CIF) values belongs to a first group or a second group;
   transmitting, to the UE, a physical downlink control channel (PDCCH) including a CIF value in a first subframe via a first carrier, wherein the CIF value is one of the plurality of CIF values in the first group or the second group; and
   transmitting a physical downlink shared channel (PDSCH) corresponding to the PDCCH to the UE according to the CIF value in the PDCCH,
   wherein a CIF value in the first group indicated an index of a carrier on which data is to be transmitted, and a CIF value in the second group indicates an index of a subframe in which date is to be transmitted, and wherein when the CIF value in the PDCCH belongs to the first group, data is transmitted only in the first subframe via a carrier indicated by the CIF value, and when the CIF value in the PDCCH belongs to the second group, data is transmitted only on the first carrier in a subframe indicated by the CIF value.

2. The method according to claim 1, wherein a PDCCH region of the UE is orthogonally located based on the index of a carrier.

3. The method according to claim 1, wherein a field of the CIF values uses reserved bits for the values of the second group.

4. A base station (BS) for transmitting data in a wireless access system, the BS comprising:
   a radio frequency (RF) unit for transmitting and a receiving a radio signal; and
   a processor for controlling the RF unit to transmit, to a user equipment (UE), a Radio Resource Control (RRC) signal indicating whether each one of a plurality of carrier indication field (CIF) values belongs to a first group or a second group, to transmit, to the UE, a physical downlink control channel (PDCCH) including a CIF value in a first subframe via a first carrier, wherein the CIF value is one of the plurality of CIF values in the first group or the second group, and to transmit a physical downlink shared channel (PDSCH) corresponding to the PDCCH to the UE according to the CIF value in PDCCH,
   wherein a CIF value in the first group indicated an index of a carrier on which the data is to be transmitted and a CIF value in the second group indicates an index of a subframe in which data is to be transmitted, and
   wherein when the CIF value in the PDCCH belongs to the first group, data is transmitted only in the first subframe via a carrier indicated by the CIF value, and when the CIF value in the PDCCH belongs to the second group, data is transmitted only on the first carrier in a subframe indicated by the CIF value.

5. The base station according to claim 4, wherein a PDCCH region of the UE is orthogonally located based on the index of a carrier.

6. The base station according to claim 4, wherein a field of the CIF values uses reserved bits for the value of the second group.

7. A method for receiving data at a user equipment (UE) in a wireless access system, the method comprising:
   receiving, from a base station (BS), a Radio Resource Control (RRC) signal indicating whether each one of a plurality of carrier indication field (CIF) values belongs to a first group or a second group;
   receiving, from the BS, a physical downlink control channel (PDCCH) including a CIF value in a first subframe via a first carrier, wherein the CIF value is one of the plurality of CIF values in the first group and the second group; and
   receiving a physical downlink shared channel (PDSCH) corresponding to the PDCCH from the BS according to the CIF value in PDCCH,
   wherein a CIF value in the first group indicates an index of a carrier on which data is to be transmitted and a CIF value in the second group indicates an index of a subframe in which data is to be transmitted, and
   wherein when the CIF value in the PDCCH belongs to the first group, data is transmitted only in the first subframe via a carrier indicated by the CIF value, and when the CIF value in the PDCCH belongs to the second group, data is transmitted only on the first carrier in a subframe indicated by the CIF value.

8. A User Equipment (UE) for receiving data in a 3GPP LTE-A wireless access system, the UE comprising:
   a radio frequency (RF) unit for transmitting and a receiving a radio signal; and
   a processor for controlling the RF unit to receive, from a base station (BS), a Radio Resource Control (RRC) signal indicating whether each one of a plurality of carrier indication field (CIF) values belongs to a first group or a second group, to receive, from the BS, a physical downlink control channel (PDCCH) including a CIF value in a first subframe via a first carrier, wherein the CIF value is one of the plurality of CIF values in the first group and the second group, and to receive a physical downlink shared channel (PDSCH) corresponding to the PDCCH from the BS according to the CIF value in PDCCH,
   wherein a CIF value in the first group indicates an index of a carrier on which data is to be transmitted, and a CIF value in the second group indicates an index of a subframe in which data is to be transmitted, and
   wherein when the CIF value in the PDCCH belongs to the first group, data is transmitted only in the first subframe via a carrier indicated by the CIF value, and when the CIF value in the PDCCH belongs to the second group, data is transmitted only on the first carrier in a subframe indicated by the CIF value.

* * * * *